(12) United States Patent
Gorokhovsky et al.

(10) Patent No.: US 9,482,105 B1
(45) Date of Patent: Nov. 1, 2016

(54) EROSION AND CORROSION RESISTANT PROTECTIVE COATING FOR TURBOMACHINERY METHODS OF MAKING THE SAME AND APPLICATIONS THEREOF

(76) Inventors: Vladimir Gorokhovsky, San Antonio, TX (US); Victor K. Champagne, Aberdeen Proving Ground, MD (US)

( * ) Notice: Subject to any disclaimer, the term of this patent is extended or adjusted under 35 U.S.C. 154(b) by 425 days.

(21) Appl. No.: 12/790,691

(22) Filed: May 28, 2010

(51) Int. Cl.
| | |
|---|---|
| F01D 5/14 | (2006.01) |
| F01D 5/28 | (2006.01) |
| F01D 5/00 | (2006.01) |
| F01D 5/12 | (2006.01) |

(52) U.S. Cl.
CPC ............. *F01D 5/288* (2013.01); *F01D 5/00* (2013.01); *F01D 5/12* (2013.01); *F01D 5/141* (2013.01); *F01D 5/147* (2013.01); *F01D 5/28* (2013.01); *F01D 5/284* (2013.01); *F01D 5/286* (2013.01)

(58) Field of Classification Search
CPC .............. F01D 5/00; F01D 5/12; F01D 5/14; F01D 5/141; F01D 5/147; F01D 5/28; F01D 5/284; F01D 5/286; F01D 5/288
USPC .......... 416/229 R; 428/635, 610; 29/889.721
See application file for complete search history.

(56) References Cited

U.S. PATENT DOCUMENTS

| | | | |
|---|---|---|---|
| 3,584,972 A * | 6/1971 | Bratkovich et al. ...... 416/229 R |
| 4,851,095 A | 7/1989 | Scobey et al. |
| 4,916,022 A * | 4/1990 | Solfest et al. ............... 428/623 |
| 4,927,713 A * | 5/1990 | Garg et al. .................... 428/627 |
| 4,981,756 A | 1/1991 | Rhandhawa |
| 5,152,774 A | 10/1992 | Schroeder |
| 5,174,024 A | 12/1992 | Sterrett |
| RE34,173 E * | 2/1993 | Kerber .......................... 428/610 |
| 5,435,900 A | 7/1995 | Gorokhovsky |
| 5,656,364 A | 8/1997 | Rickerby et al. |
| 5,912,087 A * | 6/1999 | Jackson et al. .............. 428/610 |
| 5,940,095 A | 8/1999 | Parish et al. |
| 5,940,975 A | 8/1999 | Decker et al. |
| 5,992,268 A | 11/1999 | Decker et al. |
| 6,043,451 A | 3/2000 | Julien et al. |
| 6,617,057 B2 * | 9/2003 | Gorokhovsky et al. ...... 428/698 |
| 6,663,755 B2 * | 12/2003 | Gorokhovsky ....... C23C 14/022 204/192.38 |
| 6,835,045 B1 | 12/2004 | Barbee et al. |
| 7,247,348 B2 | 7/2007 | Power |

(Continued)

OTHER PUBLICATIONS

Y.H. Cheng, T. Browne, B. Heckerman, J.C. Jiang, E.I. Meletis, C. Bowman, V. Gorokhovsky, "Internal stresses in TiN/Ti multilayer coatings deposited by large area filtered arc deposition," Published Nov. 4, 2008, Journal of Applied Physics, vol. 104, 093502.*

(Continued)

*Primary Examiner* — Nicholas Kokkinos
(74) *Attorney, Agent, or Firm* — Lathrop & Gage LLP

(57) ABSTRACT

A wear resistant coating protects against corrosion and erosion of the thin metal protective sheath on turbomachinery applications. The coating has a metal layer overlaid by a ceramic layer. Multiple metal and ceramic layers can make up the coating with the layers varying in thickness allowing the layers nearer the substrate to remain more malleable to bend with the sheath and those layers nearer the top of the coating to be more brittle and resistant to wear. A cold spray metallic layer applied to the substrate provides a lightweight, flexible layer beneath the corrosion and erosion resistant protective multilayer coating.

27 Claims, 28 Drawing Sheets

(56) References Cited

U.S. PATENT DOCUMENTS

| 7,300,559 | B2 | 11/2007 | Gorokhovsky | |
|---|---|---|---|---|
| 2005/0036892 | A1* | 2/2005 | Bajan | C23C 4/02 |
| | | | | 416/241 R |
| 2005/0139290 | A1* | 6/2005 | Boisvert | 148/212 |
| 2007/0284255 | A1* | 12/2007 | Gorokhovsky | C23C 14/024 |
| | | | | 205/89 |

OTHER PUBLICATIONS

Gorokhovsky, Hard Ceramic and Cermet Coatings for Erosion Protection of Turbomachinery Components, proceedings of ASME Turbo Expo 2009, Jun. 8-12, 2009, pp. 1-11, Orlando, Florida, USA.

Gorokhovsky, Vacuum Metal Web Coating With Cermets, proceedings of fourth International Conference on Vacuum Web Coating, Oct. 31-Nov. 2, 1990, pp. 214-231, Reno, Nevada, USA.

Gorokhovsky, Study of the Corrosion Resistance of Titanium Nitride Coated Surgical Tools, proceedings of the International Ion Engineering Congress, Sep. 12-16, 1983, pp. 1315-1318, Sakyo-ku, Kyoto, Japan.

Champagne,Jr, Formation of 'Super Plastic Agglomerate Mixing' (SPAM) Between Copper and 6061-T6511 Aluminum Deposited by the Supersonic Particle Deposition Process (SPD),USArmy Research Lab Weapons and Materials Directorate, Aberdeen, MD, USA.

Novikov,Superhard i-C coating used in complex process of surface strengthening of tools and machine parts,Surface and Coatings Technology, 47, book, pp. 770-791, 1991, Elsevier Sequoia, Printed in the Netherlands.

Gorokhovsky, Bowman, Vanvorous, and Wallace. "Deposition of various metal, ceramic, and cermet coatings by an industrial-scale large area filtered arc deposition process", J. Vac. Sci. Technol. A, Jun. 30, 2009, pp. 1080-1095, vol. 27, Issue 4.

Gorokhovsky, "Characterization of thick ceramic and cermet coatings deposited by an industrial-scale LAFAD process", Surface & Coatings Technology, available online Oct. 27, 2009, pp. 1216-1221, vol. 204, Issue 8.

* cited by examiner

Fig.21

Table 2. Mechanical properties of one-segment and two-segments coatings subjected to erosion testing based on E50TF121 Test Protocol.

| Coating ID | Coating Description | Ti sublayer time, min | TiN sublayer time, min | Total Coating Thickness μm | Hardness H. GPa | Elastic Modulus E. GPa | Coating Toughness H/E |
|---|---|---|---|---|---|---|---|
| K1 | Nano-microlaminated Ti/TiN | 2 | 13 | 40.0 | 22.3 | 359.0 | 0.062 |
| K3 | Nano-microlaminated Ti/TiN | 2 | 13 | 45.0 | 21.8 | 380.0 | 0.057 |
| P1 | Microlaminated Ti/TiN | 5 | 15 | 32.5 | 18.2 | 317.5 | 0.057 |
| Q1 | Microlaminated Ti/TiN | 5 | 25 | 40.0 | 21.9 | 366.5 | 0.060 |
| G2 | Microlaminated Ti/TiN | 20 | 40 | 33.5 | 19.0 | 318.0 | 0.060 |
| S1 | Sub-stoichiometric monolithic TiN | | | 34.0 | 37.7 | 394.0 | 0.096 |
| P1+S1 | 2-segments | | | 66.5 | 37.0 | 392.0 | 0.094 |
| Q1+S1 | 2-segments | | | 74.0 | 36.4 | 381.0 | 0.096 |
| G2+S1 | 2-segments | | | 67.5 | 36.6 | 371.0 | 0.099 |

Fig. 22

Table 3. E50TF121 Test Protocol: 20deg, Arizona Dust A4 Coarse, 600g total erodent at ~4g/sec.

| Coating ID | Coating Type | Multilayer Ratio | Coating Thickness [um] | Erosion Mass Loss [ug/g] | Coating Breached? [yes/no] |
|---|---|---|---|---|---|
| AB1 | Ti + TiN | Dual metal/ceramic segment | 32 | 0.2 | no |
| J2 | TiN | monolayer | 32 | 0.5 | no |
| X2 | TiNx | monolayer | 32 | 0.8 | no |
| K4 | Ti-TiN | 1:6.5 | 32 | 0.8 | no |
| G4 + J2 | Ti-TiN + TiN | 1:2 + monolayer | 65 | 1.3 | yes |
| G4 + K4 | Ti-TiN | 1:2 + 1:6.5 | 65 | 1.7 | no |
| G4 + X2 | Ti-TiN + TiNx | 1:2 + TiN monolayer | 65 | 4.7 | no |
| 17-4PH | uncoated, baseline | n/a | n/a | 160.7 | n/a |

Fig.23

Table 4. E50TF121 Test Protocol 90deg, Arizona Test Dust A4 Coarse, 600g total erodent at ~4g/sec

| Coating ID | Coating Type | Multilayer Ratio | Coating Thickness [um] | Erosion Mass Loss [ug/g] | Coating Breached? [yes/no] |
|---|---|---|---|---|---|
| AB1 | Ti + TiN | dual layer | 32 | 0.1 | no |
| J2 | TiN | monolayer | 32 | 0.2 | no |
| X2 | TiNx | monolayer | 32 | 0.2 | no |
| G4 + X2 | Ti-TiN + TiNx | 1:2 + monolayer | 65 | 0.3 | no |
| K4 | Ti-TiN | 1:6.5 | 32 | 0.5 | no |
| G4 + K4 | Ti-TiN | 1:2 + 1:6.5 | 65 | 0.5 | no |
| G4 + J2 | Ti-TiN + TiN | 1:2 + monolayer | 65 | 1.8 | yes |
| 17-4PH | uncoated, baseline | n/a | n/a | 3.5 | n/a |
| G4 | Ti-TiN | 1:2 | 32 | 5.2 | yes |

Table 5. Summary of tests per E50TF121 Test Protocol: 90deg, 50um Al2O3, 600g total erodent at ~6.5g/sec

| Coating ID | Coating Type | Multilayer Ratio | Coating Thickness [um] | Erosion Mass Loss [ug/g] | Coating Breached? [yes/no] |
|---|---|---|---|---|---|
| X2 | TiNx | monolayer | 32 | 4 | no |
| S1 | TiNx | monolayer | 32 | 4 | no |
| Q1+S1 | Ti-TiN + TiNx | 1:5 + monolayer | 65 | 4 | no |
| G2+S1 | Ti-TiN + TiNx | 1:2 + monolayer | 65 | 4 | no |
| P1+S1 | Ti-TiN + TiNx | 1:3 + monolayer | 65 | 5 | no |
| S1 | TiNx | monolayer | 32 | 5 | no |
| J2 | TiN | monolayer | 32 | 12 | no |
| AB1 | Ti + TiN | dual layer | 32 | 13 | yes |
| G4 – AB1 | Ti-TiN + Ti +TiN | 1:2 + dual layer | 65 | 22 | yes |
| G4 + X2 | Ti-TiN + TiNx | 1:2 + monolayer | 65 | 32 | yes |
| G2 | Ti-TiN | 1:2 | 32 | 56 | yes |
| K3 | Ti-TiN | 1:6.5 | 45 | 62 | yes |
| G2 | Ti-TiN | 1:2 | 32 | 63 | yes |
| K3 | Ti-TiN | 1:6.5 | 45 | 64 | yes |
| Q1 | Ti-TiN | 1:5 | 32 | 65 | yes |
| P1 | Ti-TiN | 1:3 | 32 | 66 | yes |
| K1 | Ti-TiN | 1:6.5 | 32 | 70 | yes |
| K1 | Ti-TiN | 1:6.5 | 32 | 70 | yes |
| P1+Q1 | Ti-TiN | 1:3 + 1:5 | 65 | 73 | yes |
| P1+Q1 | Ti-TiN | 1:3 + 1:5 | 65 | 74 | yes |
| G4 + AC1 | Ti-TiN + Ti +TiN | 1:2 + dual layer | 50 | 76 | yes |
| 17-4PH | uncoated, baseline | n/a | n/a | 81 | n/a |
| G4 | Ti-TiN | 1:2 | 32 | 88 | yes |
| K4 | Ti-TiN | 1:6.5 | 32 | 92 | yes |
| G4 + K4 | Ti-TiN | 1:2 + 1:6.5 | 65 | 109 | yes |
| G4 + J2 | Ti-TiN + TiN | 1:2 + monolayer | 65 | 305 | yes |

Fig.24

EROSION AND CORROSION RESISTANT PROTECTIVE COATING FOR TURBOMACHINERY METHODS OF MAKING THE SAME AND APPLICATIONS THEREOF

STATEMENT REGARDING FEDERALLY SPONSORED RESEARCH OR DEVELOPMENT

The subject invention was made with government support under a research project supported by United States Department of Defense Contract No. W911NF-05-2-0016. The government has certain rights in this invention.

CROSS-REFERENCE TO RELATED APPLICATIONS

Not applicable.

REFERENCE TO SEQUENCE LISTING, A TABLE, OR COMPUTER PROGRAM LISTING COMPACT DISC APPENDIX

Not Applicable.

FIELD OF THE INVENTION

The present invention relates to coated metal sheets to protect against abrasion and erosion wear, corrosion, high temperature oxidation, and other types of surface born degradation, and also relates to the method of making the protective coatings on metal sheets and various applications of metal sheets with protective coatings, and more particularly to covers for helicopter rotors.

BACKGROUND OF THE INVENTION

The rotorblades of modern helicopters are made of composite materials and suffer from wear due to sand and rain erosion as well as overheating by absorbing the sun's infrared rays. Wear degrades the adhesive used in these laminated composites and results in debonding and delaminating the blade's composite skin. Specifically, the high temperatures resulting from the blade absorbing the sun's infrared rays cause bonding deterioration and delamination of helicopter rotor blade components. Debonding is the disintegration of the epoxy or other adhesive materials between spar connections, and delamination is the peeling of layers of the composite skin forming the outer surface of the rotor blade. In addition to the ultraviolet effects of the sun, erosion, poor repairs and repeated high cyclical loading exasperates the problems of wear causing minute openings in the rotorblade's skin. A protector for protecting aircraft, particularly helicopter rotor blades, from absorbing the sun's infrared rays and the accompanying heat build-up to keep adhesive material between spar connections from debonding and to avoid delamination from the rotor blade's composite skin is described in U.S. Pat. No. 6,835,045 to Barbee et al. This rotor blade protector includes a cover configured to encircle the length of the rotor blade and a guide form for installing and removing the cover. The inner surface of the cover is coated, by vacuum deposition technology, with aluminum, titanium, or other metals or alloys. A stripper rod is attached to the guide so that aircraft personnel can install and remove the protector from the helicopter rotor blade while standing on the ground. This invention, while helping to protect the rotor blade against overheating, does not help in preventing deterioration due to sand and rain erosion.

A pre-shaped protective layer consisting of an abrasive strip having a mesh bonded to its inside surface to ease its attachment to the surface of the rotor blade is proposed in U.S. Pat. No. 5,174,024 by Sterrett. The abrasive strip is used as a sacrificial layer which is to be replaced as it wears away with usage. While this invention improves the bonding between the abrasion strip and the blade, it does not help to substantially improve the erosion resistance of the strip which will result in the necessity of replacing the strip too often especially when helicopters operate in harsh environments.

Hard wearing surfaces are in common use in various industries, and such hard wearing surfaces are frequently obtained by coating the surface of a tool made of steel or similar metal, or other hard, enduring material, with a layer of hard wearing ceramic substance, such as carbides, nitrides and carbonitrides, or providing a hard microcrystalline diamond coating. There are known methods for obtaining hard wearing coatings, such as for example, having a coating of diamond particles in combination with a carbide or nitride layer and then filling the gaps between the abrasive particles with a softer intermetallic compound. Another known method is vapor deposition of hard-wearing ceramic materials from plasma or by utilizing molten ceramic substances.

A device for creating hard ceramic surfaces by cathodic arc plasma deposition is described in U.S. Pat. No. 4,851, 095, issued to M. A. Scobey et al. on Jul. 25, 1989. The apparatus of Scobey et al. utilizes a high intensity ion flux. Vapor deposition of a hard ceramic material, such as titanium or zirconium nitride on a stainless steel or titanium surface by utilizing a molten evaporant and a hollow cathode, is described in U.S. Pat. No. 5,152,774, issued to W. A. Schroeder on Oct. 6, 1992. The vapor deposition of Schroeder is conducted at relatively low temperature, thus the substrate will have lost little of its initial high strength properties, however, the requirement of low surface roughness of the deposited layer is not addressed by U.S. Pat. No. 5,152,774. In U.S. Pat. No. 4,981,756, issued to H. S. Rhandhawa on Jan. 1, 1991, a method is taught to coat surgical tools and instruments by cathodic arc plasma deposition. The ceramic coating obtained by this technology is a nitride, carbide or carbonitride of zirconium or hafnium, in a single layer of 3-10 µm thickness. U.S. Pat. No. 4,981,756 also refers to various publications describing known equipment for obtaining hard-wearing surfaces by cathodic arc plasma deposition. U.S. Pat. Nos. 5,940,975 and 5,992,268 issued to T. G. Decker et al. on Aug. 24, 1999 and Nov. 30, 1999, respectively, teach hard, amorphous diamond coatings obtained in a single layer on thin metallic blades or similar metallic strips utilizing filtered cathodic arc plasma generated by vaporizing graphite. It is noted that coating thickness in these processes is limited to below 20 µm. Such coatings are used for a wide range of applications: surface engineered medical instruments, cutting and forming tools, protective-decorative, to name a few. Unfortunately these coatings are too thin for application as a protective erosion and corrosion resistive coatings for protective shields of the helicopter rotor blades. In addition these coatings do not have high enough reflectivity to reduce the heat ingested from the sun's radiation.

The grain size of deposits obtained in conventional physical vapor deposition (PVD) methods such as cathodic plasma arc, magnetron sputtering or electron beam PVD (EB-PVD) as well as CVD methods may range between 0.5 to 10 µm. Any post-deposition heat treatment which may be required to maintain corrosion resistance of the substrate, may lead to internal stresses in the coating due to differences in the grain size, and can eventually lead to abrasion, spalling, crack formation, grain separation, surface fractures, uneven edges and rough surfaces, and the like, which can drastically reduce the wear resistance and durability of coated objects. None of the above discussed methods are concerned with even grain size and surface structure, and low micro-roughness of the vapor deposited hard, ceramic coatings. Another disadvantage of the above mentioned conventional PVD and CVD technologies is that they are producing the hard, but brittle coatings which have very limited ductility, unable for bending without developing a large cracks, fracturing and delaminations. This makes these coatings non-applicable for such applications as protective shields for the helicopter rotor blades made of thin metal sheets or foils.

In U.S. Pat. No. 6,617,057 issued to Gorokhovsky a multilayer cermet coating is described which employs alternating metal and ceramic layer. This coating architecture provides high hardness and at the same time secures a necessary elasticity and ductility so the brittle hard ceramic layer will not fail due to bending and deformation of the substrates while a tool is in operation. Using multilayer coating architecture for erosion resistant coatings used for turbomachinery components has been described in U.S. Pat. No. 5,656,364 to Rickerby et al., which is incorporated herein by reference. Using the advanced filtered cathodic arc technology to create the multilayer coating eliminates the problems of surface roughness, produces coatings with extremely low density of growing defects, voids and porosity. This coating was successfully applied to the metal foils for their primary usage as erosion and corrosion protective-decorative coating for exterior architectural parts which is described in "Vacuum Cermet Coatings on Coiled Materials," V. Gorokhovsky, Proceedings of the Fourth International Conference on Vacuum Web Coating, (ed. by R. Bakish), Reno, Nev., 1990. The disadvantage of this type of coating is its limited thickness range, which makes it non-applicable as erosion and corrosion resistive coatings for the protective shields of helicopter rotor blades.

There is a need for a method which can provide a fine grained, hard wearing ceramic surface that has low micro-roughness, low defect density, and the ability to withstand post-deposition heat treatment, if necessary, without detriment and degradation of the coating. The produced coating should have high flexibility at a coating thicknesses exceeding 20 μm, and have high erosion and corrosion resistance properties as well as high reflectivity of the sun's radiation.

All patents, patent applications, provisional patent applications and publications referred to or cited herein, are incorporated by reference in their entirety to the extent they are not inconsistent with the teachings of the specification.

BRIEF SUMMARY OF THE INVENTION

A hard wearing ceramic surface provides high flexibility when the coating thickness exceeds 20 μm yet, has high erosion and corrosion resistance properties and high reflectivity of the sun's radiation. The coating is multilayers, or alternating metal layers and ceramic layers. Sublayer thickness and coarseness vary among the layers across the multiple layers so the coating remains flexible against the thin metal substrate that is a sheath for protecting turbomachinery yet presents a tough outer surface that is resistant to erosion and corrosion.

BRIEF DESCRIPTION OF THE SEVERAL VIEWS OF THE DRAWINGS

FIG. 21 shows the mechanical properties of one-segment and two-segment coatings subjected to erosion testing based on the E50TF121 test protocol.

FIG. 22 shows the erosion performance of coatings subjected to a 20° angle of impact by Arizona Test Dust grade A4 Coarse.

FIG. 23 shows the erosion performance of coatings subjected to a 90° angle of impact by Arizona Test Dust grade A4 Coarse.

FIG. 24 is a summary of tests per the E50TF121 Test Protocol of coatings subjected to 90° angle of impact by 50 um $Al_2O_3$.

Figure 1:
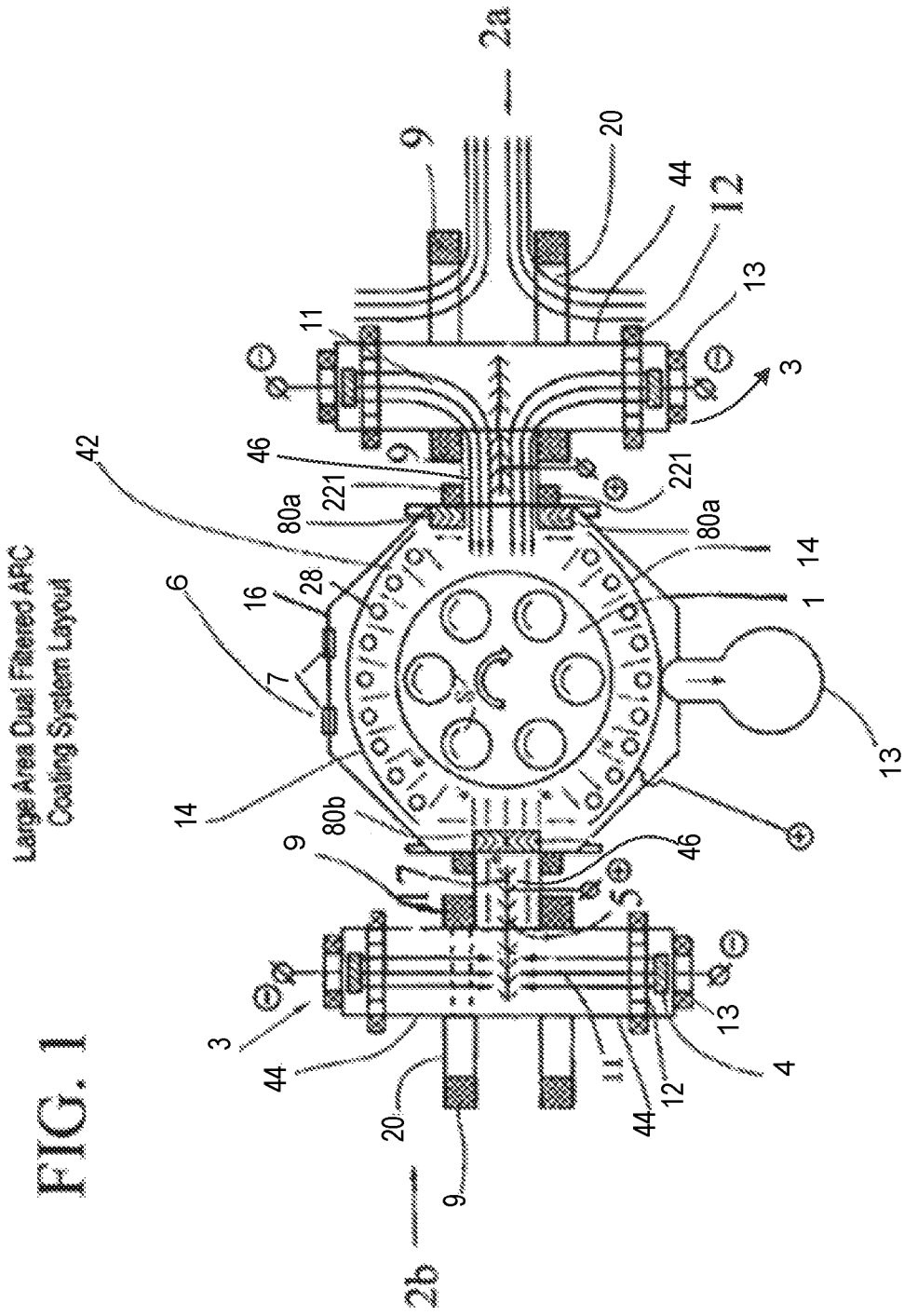
FIG. 1 is an illustrative plan view of a large area filtered arc deposition (LAFAD) coating system equipped with two LAFAD unidirectional dual large area filtered arc sources.

The patent or application file contains at least one drawing executed in color. Copies of this patent or patent application publication with color drawing(s) will be provided by the U.S. Patent and Trademark Office upon request and payment of the necessary fee.

DETAILED DESCRIPTION OF THE INVENTION

For the sake of clarity, definition of what is understood by some of the terminology used in the discussion of the preferred embodiments of the present invention is provided below.

"Substrate" is understood to mean a three dimensional body providing the surface on which the vapor species is deposited. Only a portion of the surface, usually the surface in the proximity of one end of the substrate body, is utilized as the depositing surface, and the other end of the body of the substrate is attached to or is supported by, a substrate mount or holder. It is preferred that the portion of the surface on which the deposit is to be obtained, has close to uniform temperature, while the rest of the substrate may be in a temperature gradient.

"Plasma" is considered to mean an atmosphere of low pressure and high temperature, containing a mixture of ionized gases and metal vapor. Not all the gases in the plasma are ionized, but it is usual that the species to be deposited are ionized. The components of plasma often include argon or similar inert gases, both in the atomic state and in an ionized state.

"Even surface" in the context of a deposited layer surface is understood to mean that the average distance between the peaks of the deposited surface and the valleys of the deposited surface, is small. In other words, the micro-roughness of an evenly deposited surface is considered to be low.

In one embodiment of the present invention multiple layers of a controlled thickness of a metal and of a hard-wearing ceramic compound, are deposited in successive steps on a conductive substrate surface, usually stainless steel or titanium alloy. It is preferred that at least two pairs of the metal layer and the hard-wearing ceramic layer are deposited on the steel substrate. The number of layer pairs constituting the coating however may range from 2 to as high as 100s, depending on the desired coating thickness, and on economic considerations.

Several different coating deposition processes either associated with physical vapor deposition (PVD) or chemical vapor deposition (CVD) or hybrid PVD+CVD technology can be used for deposition of the coating of the subject invention. Protective or functional thin coatings on protectors of helicopter rotorblades and other turbomachinery components such as compressor blades for turbine engines are applied to improve sand and rain erosion resistance, durability, dampening of vibration, to secure mechanical stability of the component and to avoid part deformation. In the case of helicopter rotorblades the protective coating must also have high surface reflectivity. Conventional CVD technology requires high temperature for decomposition of metal-organic, halide or hydrocarbon based precursors, which makes its applications restricted to high temperature substrates. Using low pressure plasma assisted CVD processes (PACVD) allows for reduced substrate temperatures during the coating deposition stage, but is still restricted to a limited number of elemental compositions and coating architectures. PVD processes such as magnetron sputtering and electron beam evaporation are widely used for coating deposition on cutting tools. Electron beam PVD technology (EBPVD) can provide a theoretically unlimited evaporation rate of a wide variety of different materials: metals, ceramics, cermets, both conductive and dielectric materials, but the ionization rate of the EBPVD metal vapor flow is extremely low (<0.1%) which requires ion beam assistance to achieve dense coatings with acceptable adhesion and fine microstructure.

Sputtered multilayer coating stacks using multiple sources within the same system, are used routinely for industrial manufacturing on any substrate that can handle vacuum and plasma exposure. To reduce cross-contamination from one source to another either zoned vessels or other means to isolate a source from adjacent neighbors are common. Sputtering in conjunction with a reactive gas can yield a myriad of coatings with a wide variety of elemental compositions and architectures. Matrix sputter source structures using 2 or more part targets are possible that yield various composition combinations simultaneously. The magnetron sputtering process is capable of generating an atomized vapor flow from targets having low electrical conductivity. Using a split target of graphite or boron carbide with a metal segment made of molybdenum, titanium or other transition metals allows for deposition of Me doped diamond-like and boron carbide based coatings. Co-sputtering (2 sources with different targets on each) yields variability of composition over the course of a given process. By having various targets adjacent or oriented at roughly 45° and varying the power to each source separately it is possible to yield not only different thicknesses but also different % compositions within a thin film. The primary issues with sputtering are low ionization rate and the necessity of using large concentrations of argon as a sputtering gas. Low ionization rates on the order of 1-3% in magnetron sputtering flows reduce the intensity of ion bombardment assistance during coating deposition processes resulting in coarse coating morphology with a large density of growth defects and fair adhesion. To improve coating structure, adhesion toughness, and functional properties, a number of different processes were introduced. Unbalanced magnetron methods are successful in attaining higher ionization (up to 10-15%) in comparison to conventional magnetron sources but it is still too low for substantial improvement of coating density and adhesion. Using recently introduced pulse magnetron sputtering technology allows further increases in the ionization rate, but the drawback of this approach is the reduction in the coating deposition rate (productivity). Large pulses can also generate an increased amount of macroparticles increasing the density of surface defects. The cathodic arc deposition (CAD) technology can evaporate electrically conductive (metal like) targets and produce a nearly 100% ionized vapor plasma with kinetic energy of ions ranging from 40 to 200 eV and it does not require sputtering gas, but it suffers from large amount of macroparticles generated along with the vapor plasma from cathodic arc spots located at the cathode target surface. This setback of the conventional CAD technology is overcome by filtered cathodic arc processes, which effectively eliminate the macroparticles and yield up to 100% ionized and atomized metal vapor flow. This filtration can occur by means of mechanical shutters in the direct path of the plasma to the substrate materials. The filtration can also be accomplished by bending the plasma flow in one or more bends using magnetic steering coils. In the following a brief and simplified description of this technology will be provided, however, it should be understood that this is given merely to allow clarification of the process parameters and is not intended as an accurate scientific description of the mechanisms involved in filtered cathodic arc technology. In cathodic arc technology metal droplets and metal are generated by applying an arc of high current to a negatively charged target metal in a vacuum chamber. At the same time, high concentrations of electrons are also released from the target metal cathode at high speed. The vacuum chamber, by definition, contains a gas at a low pressure, and it is usual that the gas is fed to the chamber as plasma containing a gas or a gas mixture at high temperature in a partially ionized state. The high speed electrons collide with the gas molecules, thereby further ionizing the gas molecules, which in turn collide with and ionize the metal droplets and metal vapor. The ionized gas and the ionized metal vapor and metal droplets proceed towards the negatively charged substrate also located in the vacuum chamber. The metal deposits in a layer over the surface of the substrate. When the gas is an inert gas no reaction takes place between the ionized gas and metal vapor. On the other hand, in the instance of the plasma also containing reactive gases, the ionized gases will react with the metal vapor, forming a deposited ceramic compound layer. In conventional cathodic arc plasma deposition the vaporized metal droplets in the plasma can vary in size, thus the metal or the ceramic compound deposited on the substrate is likely to exhibit widely varying grain sizes and surface unevenness.

In a recent modification of plasma technology deposits are obtained by filtering a cathodic arc source by means of an appropriately adjusted magnetic fields. An example of such a cathodic arc plasma coating apparatus is described in U.S. Pat. No. 5,435,900 issued to V. I. Gorokhovsky, which is incorporated herein by reference. The universal surface engineering system which includes two large area dual filtered arc depositing (LAFAD) plasma sources, which can be used in practicing the present invention is shown schematically in FIG. 1. The arc depositing apparatus 10, contains a main vacuum chamber 6, housing a substrate platform 1, bearing double or triple rotating satellites 8, which are utilized in supporting substrates providing appropriate depositing surfaces. Substrate platform 1 is connected to a negative bias voltage power supply for rendering the substrate surfaces receptive of ions during the deposition process. 2 load-lock shutters 80a and 80b are optionally positioned between plasma guide chambers 2 and main chamber 6 at the flange 42. Two plasma guide chambers 2a and 2b are located on opposing sides of vacuum chamber 6, each enclosing two large area dual filtered cathodic arc sources 3, appended to flanges within the plasma guide chamber. Thus the vacuum chamber 6 contains altogether four cathodic arc sources 3, but only one of those is described in detail. In the preferred arrangement two cathodic arc sources 3 are utilized, located at opposing flanged ends of the plasma guide chamber 2 attached to the cathode chambers 44, each having a metal target electrode 4. The metal target 4, is connected to the negative pole of a low voltage high current power supply, thus being capable of generating separate metal vapor jets which converge into metal plasma stream 11 in the plasma duct area 46. The metal vapor jets are focused and steered by magnetic coils 12 and 13. Deflecting coils 9 bend and collimate plasma streams 11 to direct the flow towards the substrate depositing surfaces. The focusing coil 221 is located at the end of the plasma guide chamber 2 adjacent to the main chamber 6. Metal droplets of larger size, and most of the non-ionized neutral species are trapped on baffles 5, of anode-separators 17. Anode-separators 17, bear a positive potential relative to the plasma stream and thus repel the positively charged ions, urging such ions towards the substrates. Vacuum chamber 6, is equipped with a front door 16, for loading the substrates to be coated. Front door 16, also has view ports and flanges 7, for diagnostic assessment and control of the deposition process. On the perimeter of the vacuum chamber, preferably opposite front door 16, is located a vacuum pumping system 15, which is not shown in detail. The vacuum chamber 6, also has gas entry ports (not shown). When the deflecting coils are not activated, the cathodic targets 4, serve as powerful electron emitters, thereby providing high electron currents between the cathodic targets and auxiliary anodes 14. This arrangement creates a highly ionized gaseous environment during all stages of the process: ion cleaning, ionitriding and deposition of coating layers. In addition, some form of heaters 28 can be connected to the auxiliary anodes 14, to allow the temperature of the depositing surface of the substrate to be controlled independently. Metal vapor plasma flow can be effectively interrupted by using the LAFAD deflecting magnetic field as a magnetic shutter. In a pulse filtering mode magnetic deflecting coils are periodically turning on and off. This allows creating a multilayer and/or modulated coating composition with a wide range of the sizes of sublayers.

Figure 2A:
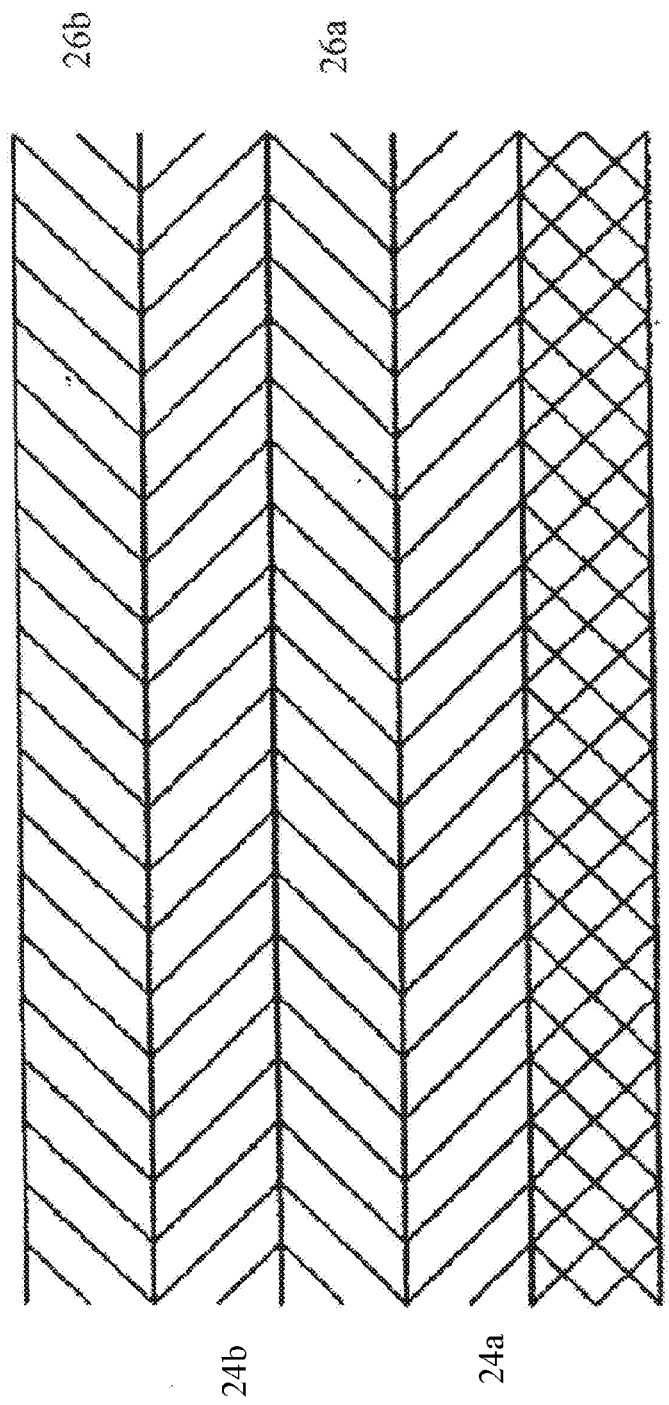
FIG. 2a is a schematic illustration of a coating composition showing a multilayer Me/MeN coating architecture.

FIG. 2A shows a multilayer coating architecture of metal sublayers 24a, 24b in turn with ceramic sublayers 26a, 26b on a metallic substrate 21 similar to that described in U.S. Pat. No. 6,617,057. This coating architecture can be further improved by reducing the bilayer periods to nanometric size, incorporating nanocomposite cermet structure into the ceramic sublayers and modulating the content of selected elements across the coating. One of the ways of making the laminated coating architecture is by modulating the current of one of the primary cathodic arc sources of the LAFAD plasma source resulting in a modulating content of selected elements throughout the coating. Specifically, the bottom segment can have metallic layers with thicknesses ranging from about 0.5 to about 5 μm while the ratio of thicknesses of metal to ceramic sublayers in one bilayer can range from about 0.1 to about 0.5. Metallic layer thickness decreases as distance from the substrate increases. The thickness ratio of metal-to-ceramic sublayers in each coating bilayer can also decrease shifting the coating properties toward ceramic when the distance from the substrate increases. Alternatively, the metal/ceramic composition with variable concentration of non-metallic elements such as carbon, boron, silicon or nitrogen can be used to control the hardness, elastic modulus and other mechanical properties of the coating depending on its distance from the substrate. For example, the Ti60N40 composition can be deposited at a location interfacing the substrate. As the distance from the substrate increases, the concentration of the nitrogen in a coating increases reaching a stoichiometric Ti50N50 composition at the top end of the coating away from the substrate. A metal rich coating has ductile metal-like properties providing flexibility and mechanical response to substrate deformation, vibration and reduced coating stress while also improving corrosion resistance of the coatings. The ceramic like composition at the top area of the coating provides erosion and wear resistance properties.

In a preferred embodiment of the invention the coating architecture comprises two or more segments, each segment comprises multilayer metal/ceramic coating. The segments positioned closer to the substrate have thicker metallic interlayers and/or larger metal-to-ceramic thickness ratios. The thickness of each segment ranges from 20 to 150 µm. In a further embodiment of the invention the ceramic interlayers having thicknesses ranging from 5 to 30 µm can be used to separate the neighbor coating segments from each other. These interlayers can serve as a corrosion barriers and also work as a membrane to accommodate coating stress in conditions of mechanical deformation and vibration.

To provide protection against sand and rain erosion the total thickness of the metal-ceramic coating ranges from about 40 to about 300 µm. Thicknesses less than about 40 µm do not provide the necessary erosion resistance properties while coatings having thicknesses of metal/ceramic segments in excess of about 300 µm are not flexible enough to sustain deformations and vibrations.

Figure 2B:
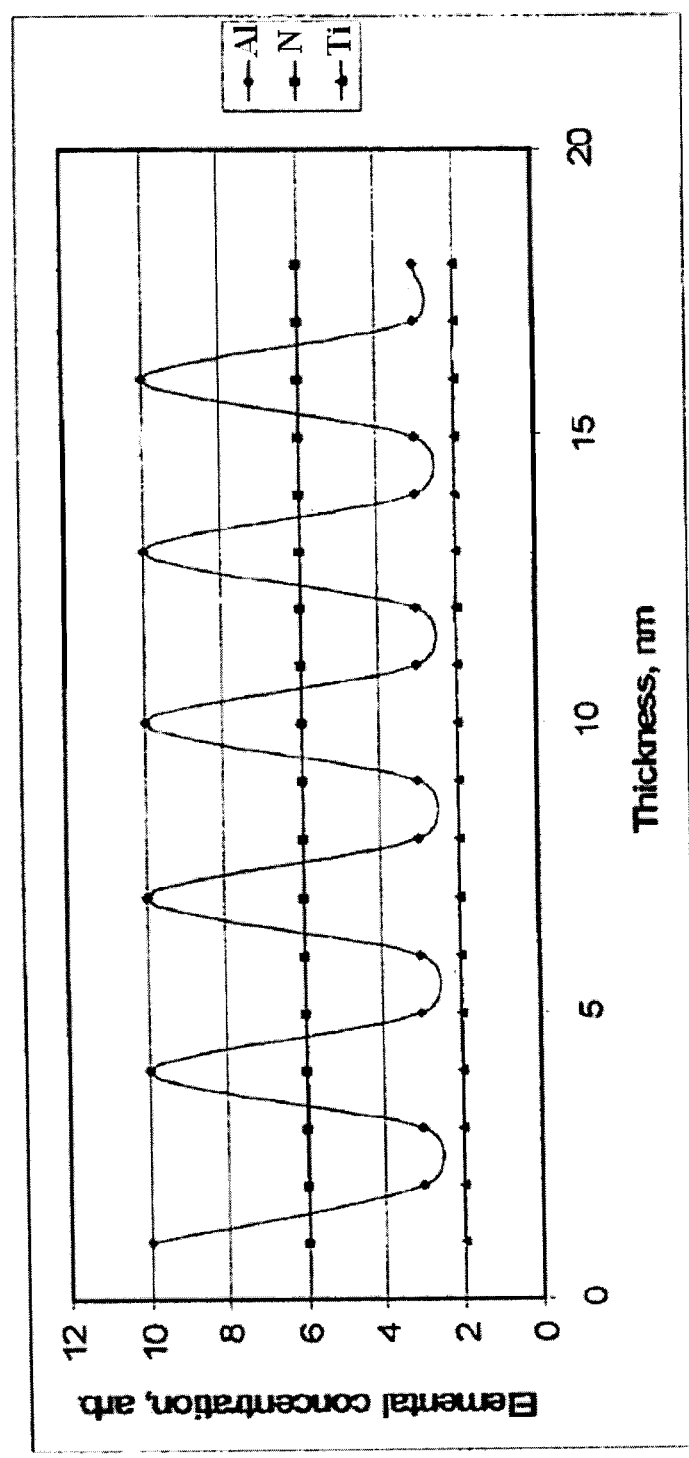
FIG. 2b is a graph showing the elemental distribution across a TiAlN coating with a modulated aluminum content.

FIG. 2b shows an example of a TiAlN coating with a modulated aluminum content, which is deposited by a dual filtered arc LAFAD plasma source with 2 targets: Ti and Al. The modulation of Al content is achieved by modulation of the arc current of the primary cathodic arc source with the Al target. Additionally, this mode can be used for precise thermal management of the substrate in the plasma vapor deposition process by modulating the ion current conveyed from the depositing metal vapor plasma toward the substrate to be coated. It is noted, however, that the apparatus of FIG. 1 is merely an example of a device utilizing magnetic plasma arc filtering. Any other high temperature depositing apparatus which may and may not be fitted with magnetic plasma arc filtering means can be employed in practicing the present invention. The operation pressure of the LAFAD plasma source which ranges from $10^{-6}$ torr to $10^{-2}$ torr overlaps with almost all conventional low pressure PVD and PACVD plasma sources combining filtered arc sources with magnetrons, EBPVD sources and thermal evaporating sources. A hybrid surface engineering system layout was described in U.S. Pat. No. 7,300,559 issued to V. I. Gorokhovsky, which is incorporated herein by reference. This allows a wide variety of coating architectures and compositions to be deposited using evaporation targets composed of different materials as well as different reaction gas precursors in a strongly ionized plasma environment. It is also noted, that the preferred vapor depositing surface engineering system shown in FIG. 1 contains two LAFAD vapor plasma sources, but in processing the erosion resistant coatings of the subject invention even using one LAFAD source with primary cathode targets made of the same metals or different metals would be sufficient. For example one target can be made of titanium and another of chromium. This results in deposition of TiCr/TiCrN nanomultilayer coatings with Ti and Cr based sublayers having thicknesses at a nanometric scale.

The application of magnetic filtering of the cathodic arc stream eliminates macroparticles, as well as neutral non-ionized species, and thereby substantially only ionized metal vapor will reach the substrate. This results in deposit layers of even grain size, and surfaces having very low micro-roughness. Such surfaces can be referred to as evenly deposited surfaces.

The substrate selected for deposition in the present process is a conductive material, such as a metal or a hard-wearing substance having relatively high electrical conductivity. It can be chosen from different grades of stainless steels or titanium alloys. In one of the preferred embodiments the substrate is stainless steel of the ASA300, 400 (such as high chromium 440A, 440B, 440C and 440XH stainless steel) or 1700 series, such as the 17-4 series. In another embodiment it is Ti6Al4V alloy, widely used for manufacturing of turbomachinery components. It is possible that steels or titanium can be doped with other elements as well, such as, for example, silicon. Prior to the coating deposition process the substrate can be subjected to a dry or wet blasting pre-treatment which has experimentally proved to contribute to better performance in sand and rain erosion protection applications. It was found experimentally that wet blasting or dry blasting pre-treatment increases erosion resistance by an order of magnitude as was presented in Vladimir Gorokhovsky, Chris Bowman, John Wallace, Dave VanVorous, John O'Keefe, Victor Champagne, Marc Pepi, Widen Tabakoff, "LAFAD Hard Ceramic and Cermet Coatings for Erosion and Corrosion Protection of Turbomachinery Components", Proceedings of ASME Turbo Expo 2009: Power for Land, Sea and Air GT2009 Jun. 8-12, 2009, Paper #GT2009-59391, which is incorporated herein by reference.

After texturing the substrate surface by a dry or wet blasting pre-treatment, the substrate surface to be coated has to be cleaned, by a usual cleaning process which can include degreasing, tumbling, grinding, polishing, chemical cleaning, electrolytic cleaning, ion bombardment or similar conventional cleaning steps which can render the surface receptive of the deposited substance. The cleaned substrate can optionally be subjected to ion implantation to increase the hardness and corrosion resistance of the substrate surface and possibly further improve adherence of the deposited coating. The ion implantation step may be conducted in a separate apparatus, or the coating system shown on FIG. 1 can be adapted to the plasma immersion ion implantation process step similar to that of the prior art described in U.S. Pat. No. 7,300,559.

TABLE 1

| Item # | Metal Layer | Ceramic metal compound layer in combination with the metal, having desired wear resistant properties |
|---|---|---|
| 1 | Ti | TiC, TiN, Ti(CN), Ti(OCN) |
| 2 | Zr | ZrC, ZrN, Zr(CN), Zr(OCN) |
| 3 | V | VC, VN, V(CN), V(OCN) |
| 4 | Cr | CrN, CrC, CrCN |
| 5 | Hf | HfN |
| 6 | Mo | MoN |
| 7 | Nb | NbN, NbC |
| 8 | W | WC |
| 9 | Ti-Zr alloy | TiZrC, TiZrN, TiZr(CN), TiZr(OCN) |
| 10 | Ti-Cr alloy | TiCrC, TiCrN, TiCr(CN) |
| 11 | V-Ti alloy | VTiC, VTiN, VTi(CN) |
| 12 | Ti, Mo | TiMoN |
| 13 | Ti, Al | TiAlN, TiAlON |
| 14 | Ti, Al, Si | TiAlSiN |
| 15 | Ti, Nb | TiNbN |
| 16 | Al | AlN, $Al_2O_3$ |
| 17 | Cr, B | $CrB_2$ |
| 18 | Ti, B | $TiB_2$ |
| 19 | Al, B | $AlB_2$ |

This treatment creates a case on the surface of the substrate to be coated preventing against the egg-shell effect which can reduce performance of thin film hard coatings deposited on a relatively soft substrate. This case is designed to accommodate the plastic deformation of the relatively soft substrate. This case also contains some elements identical to the elements in the first coating layer interfacing the substrate surface which increases adhesion of the coating to the substrate.

The substrate having a cleaned, and optionally ion implanted depositing surface, is then placed in the vacuum chamber of a suitable cathode arc plasma depositing device having at least one plasma vapor deposition means, such as described above. The arc cathode targets, magnetron targets, EBPVD evaporating material, resistive evaporating material and arc PACVD reactive gaseous precursors are selected for the plasma vapor generation, and are selected as they are capable of forming hard, wear, erosion and corrosion resistant compounds by vapor deposition. The metallic and non-metallic elements which are preferred in such compound formation are titanium, chromium, vanadium, molybdenum, aluminum, hafnium, zirconium, niobium, tungsten, their alloys, carbon, boron, silicon, and elements of similar nature. The preferred reaction gaseous precursor are nitrogen, hydrogen, oxygen, hydro-carbon gases, borazin, boron trichloride, trimethylsilane (3MS) and gases of similar nature.

The gas atmosphere in the cathodic arc depositing device is controlled such that it can yield either a vapor deposited metal layer or a vapor deposited ceramic compound layer. The ceramic compounds that have desired wear resistance, corrosion resistance and hardness are the carbides, nitrides, carbonitrides, oxycarbides and oxynitrides of the above listed metals. The plasma for depositing the desired ceramic layers contains one or more of the following gases: nitrogen, methane or other hydro-carbon gas, borazin, 3MS and oxygen. In the vapor deposition of layers of the above listed metals only argon, or similar inert gas containing plasma is used. Argon may also be utilized to dilute or carry the gases reacting with the metal vapor or metal deposit, to form the desired ceramic compounds. The metal and ceramic compound combinations suitable for forming hard, wear, erosion and corrosion resistant coatings by vapor deposition in the present invention, are listed in Table 1 above. In addition to the coating compositions presented in Table 1 the carbon based diamond-like coatings (DLC) with addition of different metals such as Ti or Cr doped DLCs having hardnesses above 30 GPa can also be selected preferably for the top segment coating.

Figure 3:
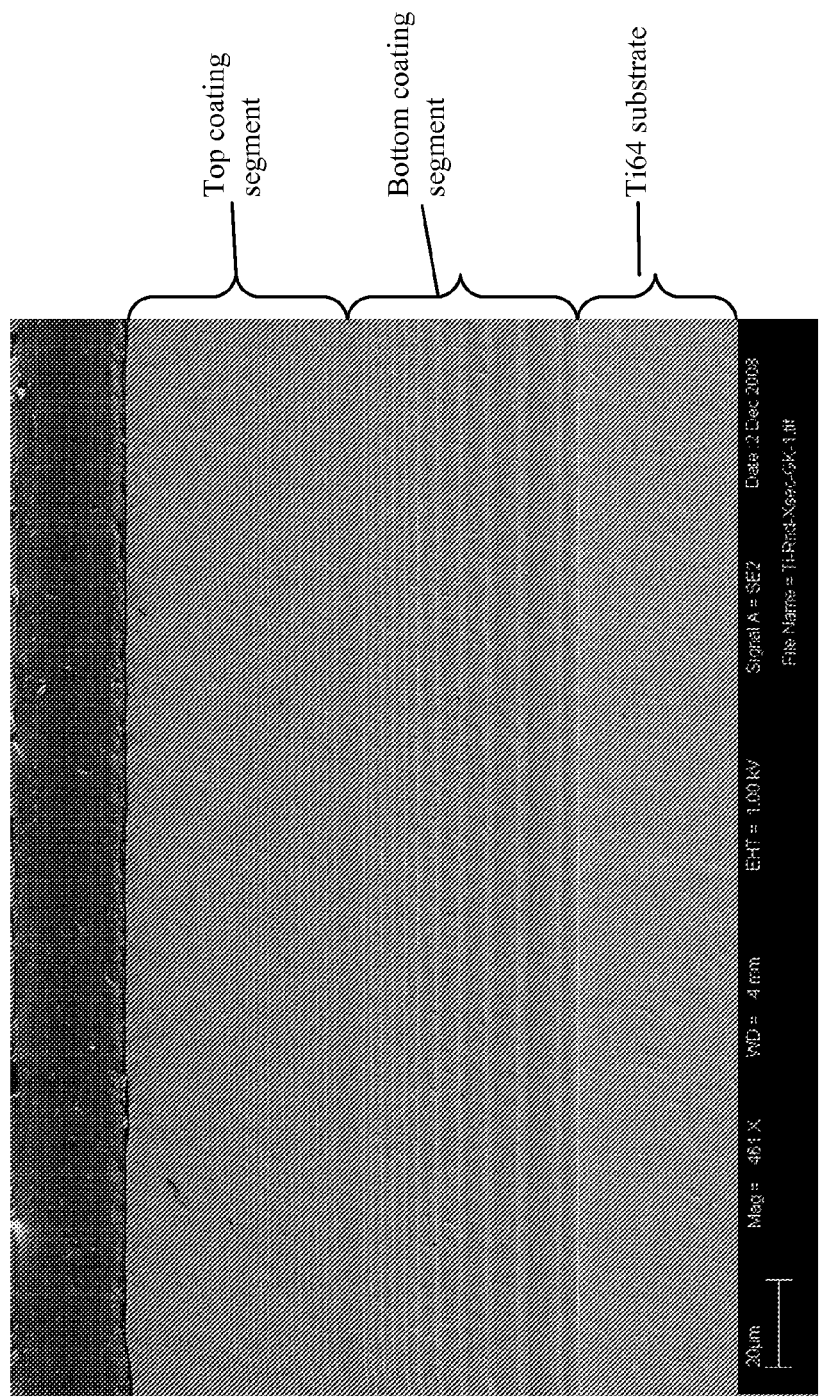
FIG. 3 is a SEM micro-image of the cross-section of a 2-segment Ti/TiN multilayer multi-segment coating.

When large metal sheets both straight, and pre-formed to the desirable application driven geometry, are used as substrates for the ultra-thick ceramic or cermet coatings, coating deposition results in substantial deformation of the substrates caused by large stresses in a coatings. To reduce or completely eliminate these stresses and associated distortion of the substrate, the coating architecture consists of one or more segments of a multilayer coatings as presented in a present invention. A first approach to such architecture is a multilayer coating design having metal sublayers in turn with ceramic sublayers similar to that described in U.S. Pat. No. 6,617,057. The mechanical properties in this prior described coating such as hardness and elastic modulus are evenly distributed across the coating. The coating therefore is unable to accommodate the large coating stress and low elastic modulus required when, for example, the thin metal substrate of a helicopter protector is bent and yet at the same time to secure the high hardness associated with brittle ceramic layers. To solve this problem the present invention proposes a change in the multilayer structure along the coating cross-section with larger metallic segments incorporated in parts of the coating facing the substrate and more ceramic incorporated in the part of the coating facing toward the top of the coating. One example of cross-section of such erosion resistant coating on a substrate has two segments: the bottom segment B with large metallic sublayer, lower hardness and lower elastic modulus followed by top segment T with smaller metallic sublayers, having higher hardness and elastic modulus is shown in FIG. 3.

Figure 5:
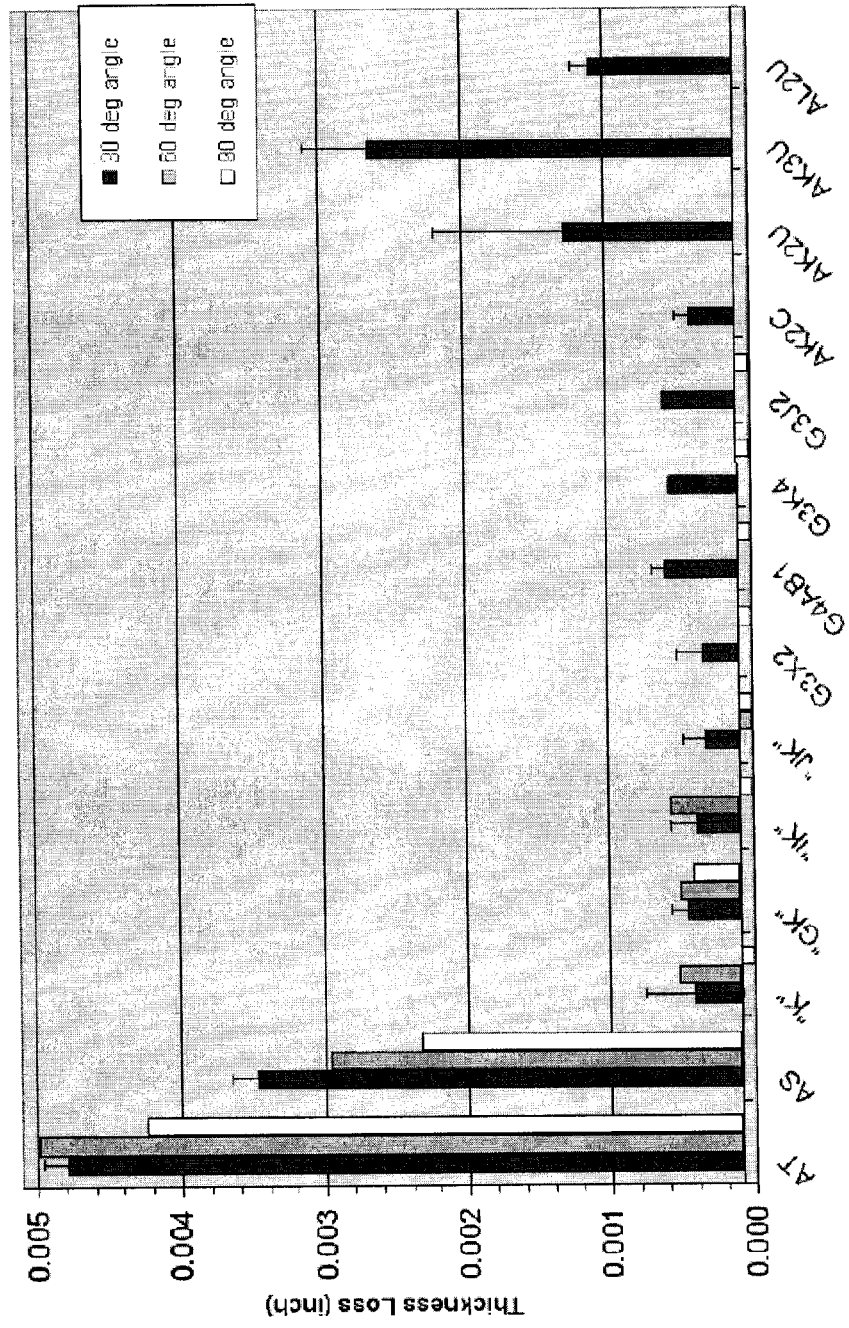
FIG. 5 is a chart representing sand erosion test results of different TiN coatings deposited by the LAFAD process.
Figure 6:
FIG. 6 is a SEM micrograph of the surface of a LAFAD thick multilayer coating deposited on a wet blasted titanium substrate.

The results of testing for sand erosion resistance of the different duplex and single segment multilayer and monolithic TiN coatings deposited by LAFAD process are shown in FIG. 5. G is a microlaminated coating having a thickness of approximately 50 μm. GK, IK and JK are duplex coatings with the bottom segment made either of multilayer G coating or monolithic I and J coatings, all of them about 50 μm thick. K is a nano-multilayer coating approximately 35 um thick coating. The GK coating cross-section is shown in FIG. 3. AL2U is a TiAlN 50 μm coating. The letter "A" in the coating identification stands for Arcomac Surface Engineering, LLC, of Missoula Mont. where the coating was deposited. The letters "C" and "U" stand for the central and the upper positions, respectively, of the square samples in a substrate holder during the LAFAD coating deposition trial. Note: (−) thickness loss value denotes coating failure during the test. 300 mph at 90 degrees resulted in 0.0002-inch wear for K, GK, IK, JK. The "GK" sample had small pits at 90 degrees after 30 g/cm$^2$ then was subsequently tested to 60 g/cm$^2$ at 500 mph at a 90 degrees angle which caused several large through-coating pits exposing the substrate. "GK" 500 mph at 30 degrees angle sample was subsequently tested to 60 g/cm$^2$, resulting in a net 0.0006-inch total wear. These results demonstrated that the 2-segment GK coating has a superior erosion resistance performance compared to single segment monolithic and multilayer coatings. It also overperforms the IK and JK coatings with a monolithic bottom segment layer. The typical surface morphology of all erosion resistant coatings deposited on dry-blasting or wet blasting pre-treated surfaces have shown a dome-like pattern as illustrated in the SEM microimage in FIG. 6. These coatings have demonstrated a 10× higher erosion resistance compared to the coatings deposited on polished surfaces which don't develop this pattern in a LAFAD coating deposition process. It was observed in a number of experimental trials and subsequent testing that the dome-like pattern is necessary to secure high erosion resistance for the coatings. The characteristic width of one single dome can range from 1 to 10 μm. This pattern can be obtained by pre-treatment methods other than dry- or wet-blasting. For instance, powder spray coating such as cold spray, plasma spray, thermal spray or HVOF spray can be deposited as a first coating segment followed by the PVD metal/ceramic multilayer coating. In this case the dome-like pattern will be also developed by building the PVD coating on a top of the powder coating having a well-shown surface pattern similar to that obtained by dry-blasting or wet blasting pre-treatment.

Figure 10:
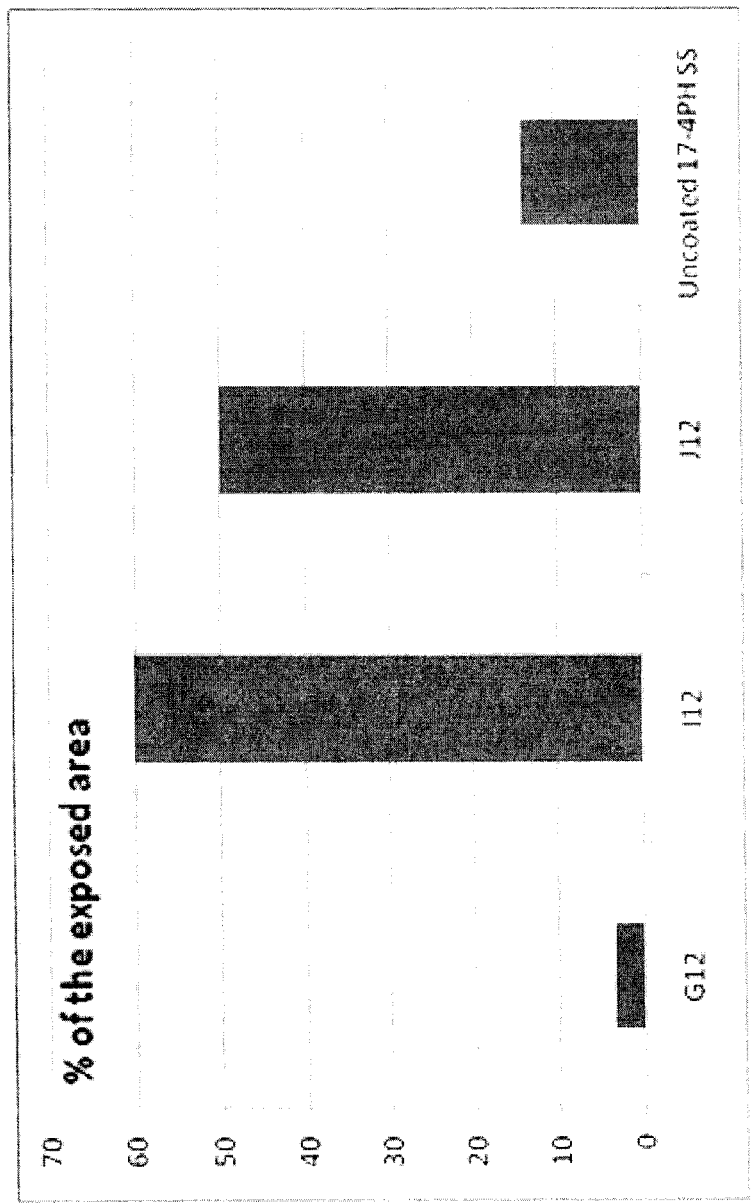
FIG. 10 shows a percentage of corrosion damage in various samples, compared to uncoated stainless steel, after 336 hours of exposure to a salt fog.
Figure 11:
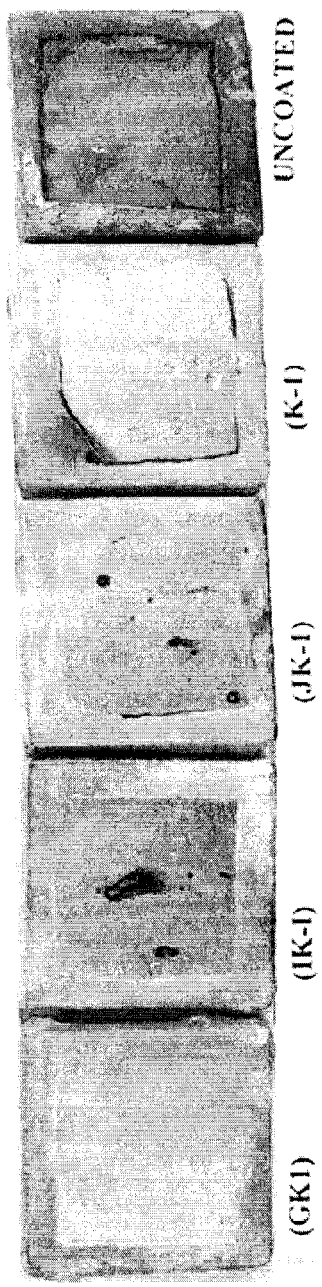
FIG. 11 shows photographs of corrosion damage on samples having 2-segment coatings GK1, IK1, JK1, sample with multilayer coating K1, and an uncoated 17-4PH SS after 336 hours of exposure to a salt fog.

Salt spray corrosion tests of different single segment and dual-segment coatings were conducted per ASTM B 117-07/PTP 1019 standards for 336 hours with a specimen support angle of 15°. Epoxy paint was applied to the circumference and bottom of the samples as a corrosion mask to ensure that all corrosion occurred on the coated face of the samples. Photos were taken at 24 hour intervals and at completion of the testing, and the percentage of surface area covered with red corrosion was assessed. Bead blasted 17-4PH stainless steel substrates having an initial roughness RMS~0.8 μm were tested in uncoated and coated conditions to provide relative comparison of the corrosion protection of thick TiN based LAFAD coatings. From FIG. 10 it can be seen that microlaminated G coating having 10 Ti/TiN bilayers with a total thickness of 50 μm (the bottom coating segment shown in FIG. 3) overperforms both monolithic TiN coatings and uncoated 17-4PH steel. The best results on corrosion protection performance were obtained with the ultra-thick nano-microlaminated Ti/TiN coatings having thicknesses ranging from 50 to 100 µm. These included a one-segment K-coating and two-segment K+G, K+I and K+J coatings. It can be seen from the photograph of the surface of coupons presented in FIG. 11, that the nano-microlaminated 50 µm thick single-segment K-coating and the 100 µm thick two-segment GK coating provided 100% inhibition of corrosion, while the 100 µm thick two-segment IK and JK coatings (consisting of bottom segment monolithic I or J coating followed by top segment nano-microlaminated K-coating) showed a few pits with not more than 2% of the exposed area corroded.

The following examples are offered to further illustrate but not limit both the compositions and the methods of the present invention.

Example 1

Large Area Filtered Arc Deposition of Erosion and Corrosion Resistant TiAlN Multilayer Multi-Segment Coating on Metal Sheets, Foils, Instruments and Machine Components The arc coating apparatus shown in FIG. 1 is used in this process. The apparatus is equipped with two dual-filtered arc sources, 2a and 2b having round cathodes 4 measuring 3" in diameter and 2" in height, one filtered arc source 2a having titanium targets and the other 2b having aluminum targets. The exit openings of the filtered arc sources are equipped with load lock shutters 80a, 80b, electron-permeable to provide a free passage of electron current from the cathode targets 4 to distal auxiliary anodes 14 to thereby establish an auxiliary arc discharge.

A 12" wide×60" long×1/64" thick stainless steel metal strip as a substrate 8 is installed around the turntable 1 with the center of the strip positioned at an even height with the center of the opening of the plasma duct 46. The metal strip substrate is subjected to wet blasting pre-treatment prior to loading into the vacuum chamber for deposition of the metal/ceramic coating. The vacuum chamber 6 is evacuated to 4×10-6 Torr and then argon is injected to create a total pressure ranging from 4×10-4 to 8×10-4 Torr. The substrate metal strip is preheated to 350° C. Vertical magnetic rastering coils on both filtered arc sources 2a and 2b are turned ON. Both load lock shutters 80a, 80b located at the exit of the filtered arc source 2a equipped with titanium targets and filtered arc source 2b equipped with aluminum targets, respectively, are locked and cathode targets 4 are activated in at least one filtered arc source, preferably that with the titanium targets, a substrate turntable rotating speed is set at 16 RPM. The deflecting magnetic system is not activated. The auxiliary arc discharge is activated between the cathodes 4 of the filtered arc source and the distal auxiliary anodes 14 installed in the coating chamber 6. After the ion cleaning stage a 2 min high voltage metal ion etching stage is performed at substrate table bias −1000 volts. At this stage the load lock shutter 80a of source 2a with titanium targets is opened and magnetic deflection and focusing coils of the titanium filtered arc source are turned ON. After metal ion etching the turntable bias is reduced to −40 volts and titanium bond layer is deposited during a 3 min deposition time. After this stage the filtered arc source 2b with aluminum targets is activated, its deflection and focusing magnetic coils are turned ON and its load lock shutter 80b is opened. The nitrogen as a reactive gas is injected at total pressure of 0.2 mtorr to replace the argon during the deposition of TiAlN nano-multilayer coating. The cathodic arc current is setup at 200 amperes for both cathode targets 4 of the primary cathodic arc sources 3. The coating deposition process is performed during 12 hrs. The magnetic deflecting system of the source 2b with aluminum targets is turned OFF each 10 min for a duration of 2 min working in a magnetic shutter mode and nitrogen is replaced with argon during the 2 min of deposition of titanium interlayers by source 2a which separates the TiAlN interlayers forming a nano-multilayer TiAlN/Ti metal-ceramic laminated coating architecture. After the deposition process is finished the chamber is cooled and the metal strip with a nano-microlaminated TiAlN/Ti coating is removed from the chamber.

A similar process run was performed by using only one LAFAD unidirectional vapor plasma source 2 equipped with one titanium and one aluminum target. The rest of the process parameters remained the same as described above. The maximum thickness of the TiAl/TiAlN nanolaminated multilayer coating deposited in this process was 60 µm as measured via SEM micrograph of the metallurgical cross-section of the coated sample taken from the central area of the coated metal sheet strip. The coating thickness distribution over the 12" wide area of the metal strip was +/−15%. The approximate thickness of TiAl and TiAlN biperiods in the nanolaminated architecture was 4 nm. The thickness of metallic sublayers in the coating region interfacing the substrate was 0.6 µm while at the top of the coating the thickness of metallic interlayers were reduced to about 0.1 µm. The hardness of this coating measured by nano-indentation at the top surface of the coating was 30 GPa and elastic modulus 400 GPa exceeding the hardness of Ti/TiN based coatings. In this coating architecture the Ti rich nano-sublayers were followed by Al-rich nano-sublayers as a result of sequential exposure of the substrate to the Ti metal vapor plasma flow generated by the primary cathodic arc source 3 equipped with the titanium substrate followed by exposure to the aluminum vapor plasma generated by the primary cathodic arc source 3 with aluminum target installed in the opposite position at LAFAD plasma source 2. The thickness of titanium- and aluminum-rich sublayers can be estimated at about 4 nm.

Example 2

Deposition of a 2-Segment Microlaminated Ti/TiN Coatings by the LAFAD Process

A Ti/TiN microlaminated coating was deposited by an LAFAD process on 1"×1"×1/8" square coupons made of Ti6Al4V alloy. The coupons were pre-treated by wet blasting prior to loading them in the vacuum chamber 6 of the coating system shown in FIG. 1. Only one unidirectional dual LAFAD source 2 was used in this process. Both primary cathodic arc sources 3 of the LAFAD source 2 were equipped with titanium targets. The substrate coupons 8 were installed on turntable 1 with a single rotation at a rotating speed of 12 RPM. In SR mode, the substrates are rotated around the axis of the turntable with their front surface facing the chamber walls. The coating process consists of pre-heating to 350° C., twenty minutes of ion cleaning, and two minutes of high voltage (1000V) metal ion etching; followed by coating deposition steps in a pressure range from 0.4 to 0.8 mTorr. To provide a substrate bias during the coating deposition process for deposition of conductive coatings, an MDX-II (Advanced Energy) power supply, coupled with Sparcle-V accessory, was used as a DC bias power supply. The substrate bias during deposition of the Ti/TiN coating was −40V. The metal sublayer was deposited for 15 min followed by a 45 min deposition of TiN ceramic sublayer. The total coating time was 12 hrs which resulted in deposition of 10 bilayers of G coatings having a total thickness of 50 μm shown in FIG. 3. During this run the 3" dia×3" tall conical titanium cathode targets were almost 90% consumed. After cooling the chamber the Ti cathode targets were replaced with the new targets and the coating deposition process was repeated with the same processing parameters as for deposition of the G coating but duration of deposition of metallic sublayer was reduced to 3 min and the duration of deposition of TiN ceramic sublayers was reduced to 12 min in comparison with the process of deposition of the G coating bottom segment. The resulted top coating K segment had 40 layers over the total thickness of about 50 μm as shown in FIG. 3. The thickness of metallic sublayers in the area interfacing G coating was about 0.3 mm reducing to about 0.05 mm at the top of K coating. The resulting GK coating had hardness 25 GPa and elastic modulus 415 GPa measured at the top surface of the coating by nano-indentation technique while the G coating had hardness of 19 GPa and elastic modulus 320 GPa.

Figure 7:
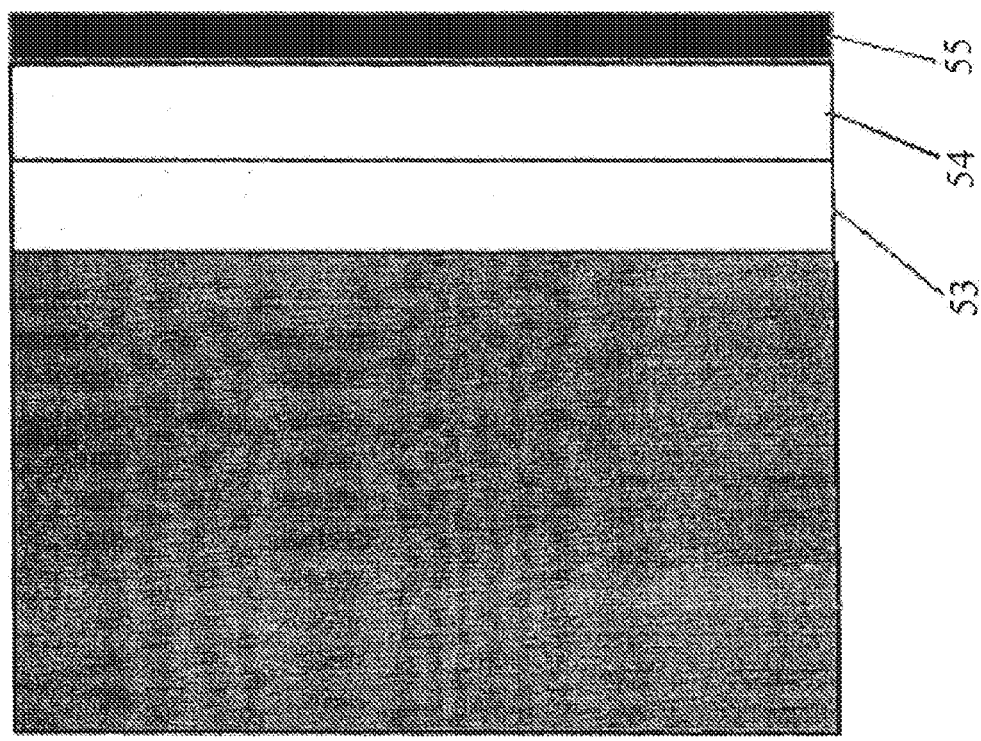
FIG. 7 is a schematic diagram of a cross-sectional view of a preferred embodiment of the protector for helicopter rotorblades utilizing a 2-segment Ti/TiN multilayer coating and a top DLC segment.

FIG. 7 illustrates a further embodiment of the present invention comprising a top superhard segment coating on top of microlaminated metal/ceramic segments. In this embodiment a diamond like coating (DLC) 55 having thicknesses ranging from 5 to 60 μm is deposited on a top of second segment 54 metal/ceramic microlaminated coating having smaller metal sublayers and smaller bilayers than that of the bottom segment 53. The carbon DLC coating is superhard coating which makes it the best candidate material for erosion resistant coating applications as was indicated in U.S. Pat. No. 7,247,348 to Power, which is incorporated herein by reference. The carbon DLC coatings deposited by LAFAD process have demonstrated their superior hardness, good adhesion and mechanical stability as presented in N. Novikov, V. Gorokhovsky and B. Uryukov, "Superhard i-C Coatings Used in Complex Processes of Surface Strengthening of Tools and Machine Parts," Surface and Coatings Technology, 47, (1991) 770, which is incorporated herein by reference. The following example provides typical coating deposition process parameters for deposition of the top DLC coating for erosion protection of helicopter rotorblades.

Example 3

Figure 8:
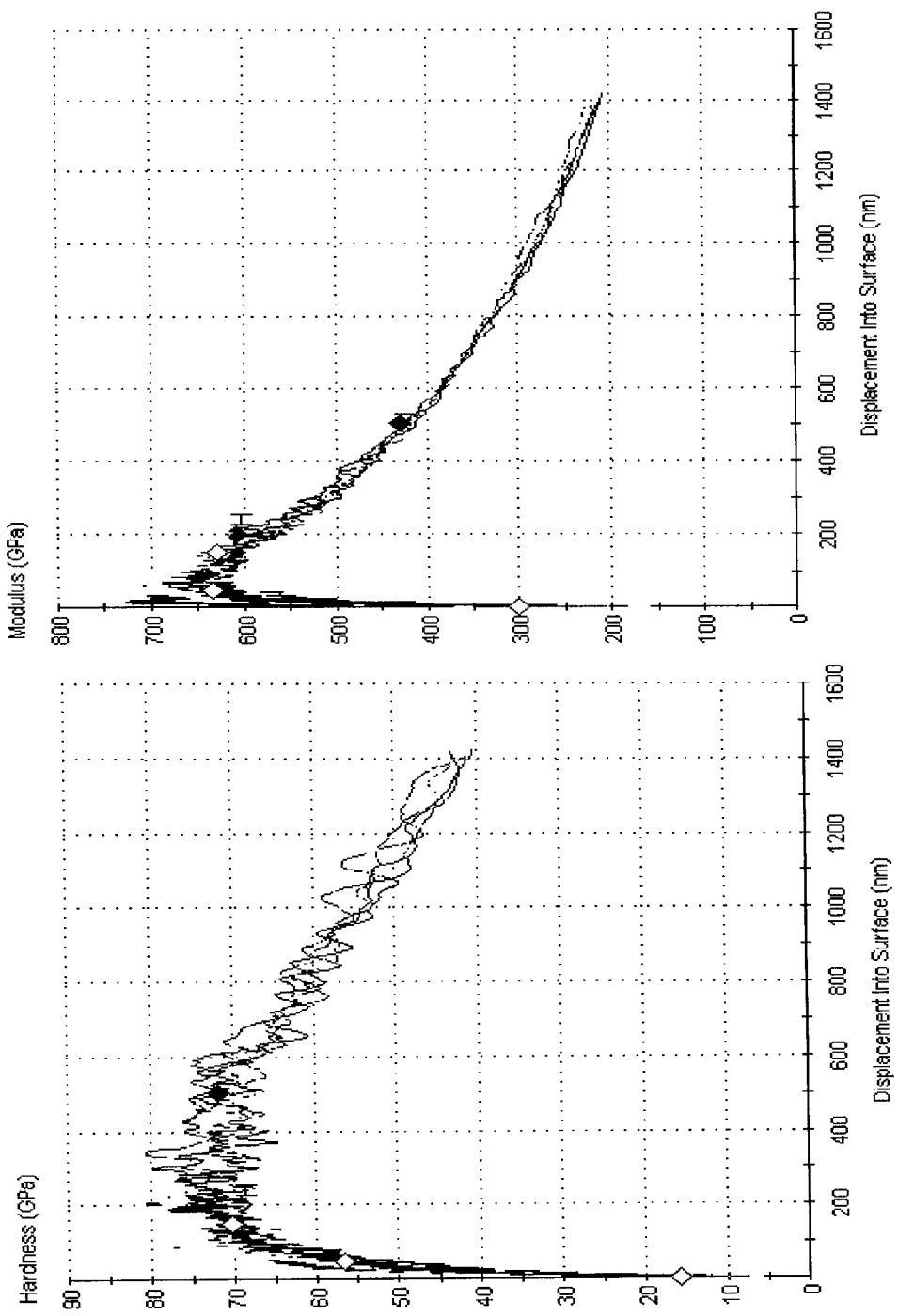
FIG. 8 are graphs showing hardness and elastic modulus of a 6 μm thick DLC coating on Al as a function of displacement to the surface.
Figure 12:
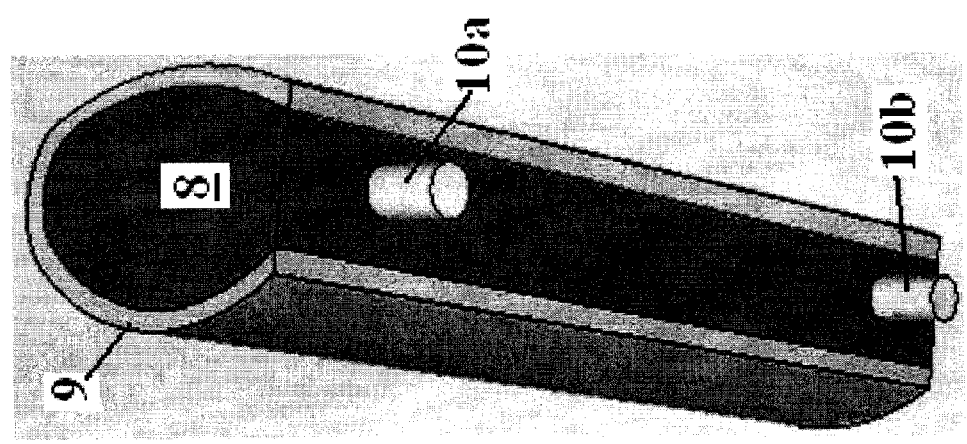
FIG. 12 shows a protector airfoil attached to the water-cooled protector holder for deposition of a carbon DLC topcoat by the LAFAD process.

Deposition of DLC Coating on Water Cooled Aluminum Substrates by a LAFAD Process The DLC coatings were deposited by one unidirectional LAFAD plasma source installed in a coating system similar to that shown in FIG. 1. Aluminum disk coupons 60 mm dia×5 mm thick and aluminum strips 100 mm long×60 mm wide×5 mm thick were installed on turntable 1 attached to the water-cooled copper blocks using thermal conducting paste. An example of the curved protector airfoil 9 attached to the water cooled copper block 8 for deposition of the carbon DLC is shown schematically in FIG. 12. The copper block 8 has water inlet 10a and outlet 10b. The coating chamber was evacuated to the ultimate vacuum of $10^{-6}$ torr. Both primary cathodic arc sources 3 of the LAFAD plasma source 2 were equipped with high purity graphite targets 4. The additional anode grid made of tungsten bars ½" thick with the distance between the bars ¾" was installed in front of the graphite target to provide a better stability of cathodic arc evaporation process in a low pressure range required for deposition of a high quality hydrogen-free DLC. The substrate table was connected to the RF generator with 13.56 MHz frequency to provide an RF bias during the coating deposition process since the DLC has a very high electrical resistivity>$10^6$ Ohm cm. The process starts with ion cleaning in Ar as described in Example 1. After the ion cleaning stage the gas supply line was closed and the filter deflecting field produced by the deflecting coils 20 and focusing coils 221 was turned ON to start the DLC deposition process. This coating deposition run lasted 3 hrs. The coatings deposited in this process were characterized by their thickness, hardness, elastic modulus and corrosion resistance. The preliminary characterization of the aluminum disk samples with the DLC deposited in this run was published in N. Novikov, V. Gorokhovsky and B. Uryukov, "Superhard i-C Coatings Used in Complex Processes of Surface Strengthening of Tools and Machine Parts," Surface and Coatings Technology, 47, (1991) 770. The DLC deposited in this run had a thickness of 6 μm. The hardness and elastic modulus of the 6 μm thick DLC on the Al disk was measured using a nanoindenter (MTS Nanoindenter XP, CSM). A continuous stiffness module was used. 8 indents were measured on the coating with a fixed total displacement of 1400 nm. A Berkovich tip was used. As shown in FIG. 8, the deposited DLC coating exhibits extremely high hardness and elastical modulus. The mean hardness calculated over 200-500 nm displacement (~4-8% of coating thickness) is 73.0+/−2.5 GPa. The mean modulus calculated over 50-150 nm displacement is 645+/−30 GPa. The rapid decrease in both hardness and modulus with displacement of above 400 nm indicates the strong effect of the soft Al substrate on the measured hardness and modulus. This softening effect is eliminated when the intermediate hard metal ceramic coating having hardness ranging from 15 to 40 GPa is deposited between a metal substrate and the top DLC segment.

Figure 9:
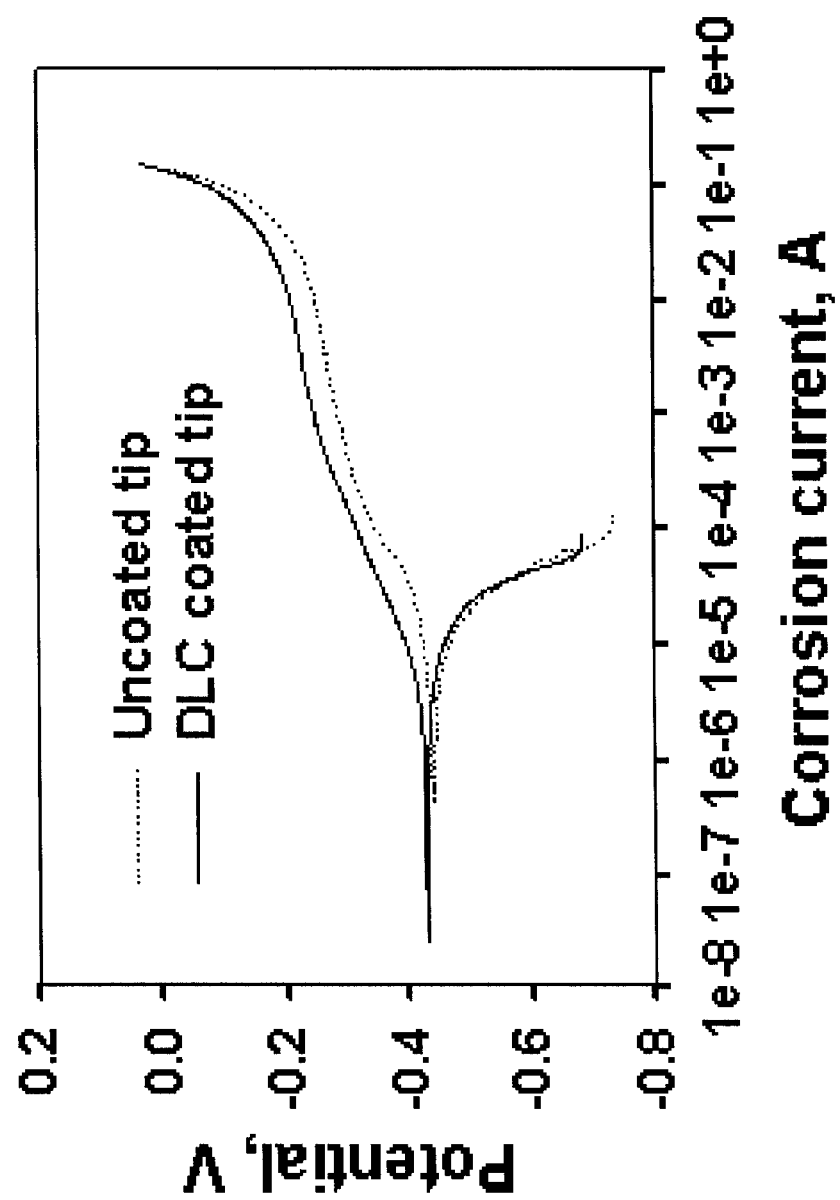
FIG. 9 are typical potential-current curves for a 0.5 μm DLC coated 440A steel sample vs. a 2 μm TiN coated 440A steel sample.

In another LAFAD process run, a set of thin DLC coatings were deposited on high chromium 440A stainless steel substrates using the same LAFAD coating process as described but the substrates were not water cooled. The thickness of these coating was 0.5 μm. The corrosion resistance of these coatings was compared to Ti/TiN multilayer coatings having a thickness of about 2 mm that were deposited by the LAFAD process described in Example 2. An electrochemical method was performed to characterize the corrosion properties of the coated practices. This methodology described in K. Gordashnik, V. Gorokhovsky, B. Uryukov, "Study of Corrosion Stability of Medical Instruments with TiN-Covers," Proceedings of the International Ion Engineering Congress, ISIAT 83, Institute of Electrical Engineers, Kyoto, Japan, 1983. A potentiodynamic scan in the voltage range of −250 mV vs. $E_{oc}$ (open circuit potential) to +500 mV vs. $E_{oc}$ was used to measure the corrosion properties, such as corrosion potential and corrosion current. Testing was performed in 3.5% NaCl solution using POWERCORR software with a EG&G 263A potentiostat from Princeton Applied Research. The reference and auxiliary electrodes are a saturated calomel electrode (SCE) and a graphite rod electrode, respectively. FIG. 9 shows typical Potential-Current curves for DLC coated and TiN coated scale tips. As shown, the curve of the DLC coated scale tip shifts to higher potential and lower current. Curves were measured using the Tafel model, the corrosion current and corrosion potential for the DLC coated samples and uncoated samples were calculated to be 7.2 μA, 12 μA, −428 mV, and −439 mV, respectively, indicating good corrosion properties of DLC coated scale. The improved corrosion resistance properties of the DLC coatings result from their high density and inertness in aquatic electrolyte solution.

Deposition of ultra-thick ceramic coatings on thin sheet metal strip substrates imposes considerable mechanical stress on the metal strip substrate resulting in its deformation. To substantially reduce or completely eliminate this effect the back side of the substrate metal sheet is supported by a metal cage having thicknesses of 1 to 10 times the thickness of the metal sheet substrate. The metal cage is attached to the back side of the metal sheet substrate by point-welding. Alternatively, narrow grooves are made on the back side of the metal sheet substrate by laser cutting. The network of grooves had a square checked pattern with the side of one cell about 1". The depth of the grooves ranged from 0.2 to 0.8 the thickness of the metal sheet substrate. This network of the grooves relieves the mechanical stress and reduces or completely eliminates deformation of the metal sheet substrate. Alternatively, the coating can be applied in a discontinuous pattern of repeated geometric shapes which are separated by narrow uncoated ribbons. The shapes can be, for example, squares, triangles, and rectangles.

Figure 13:
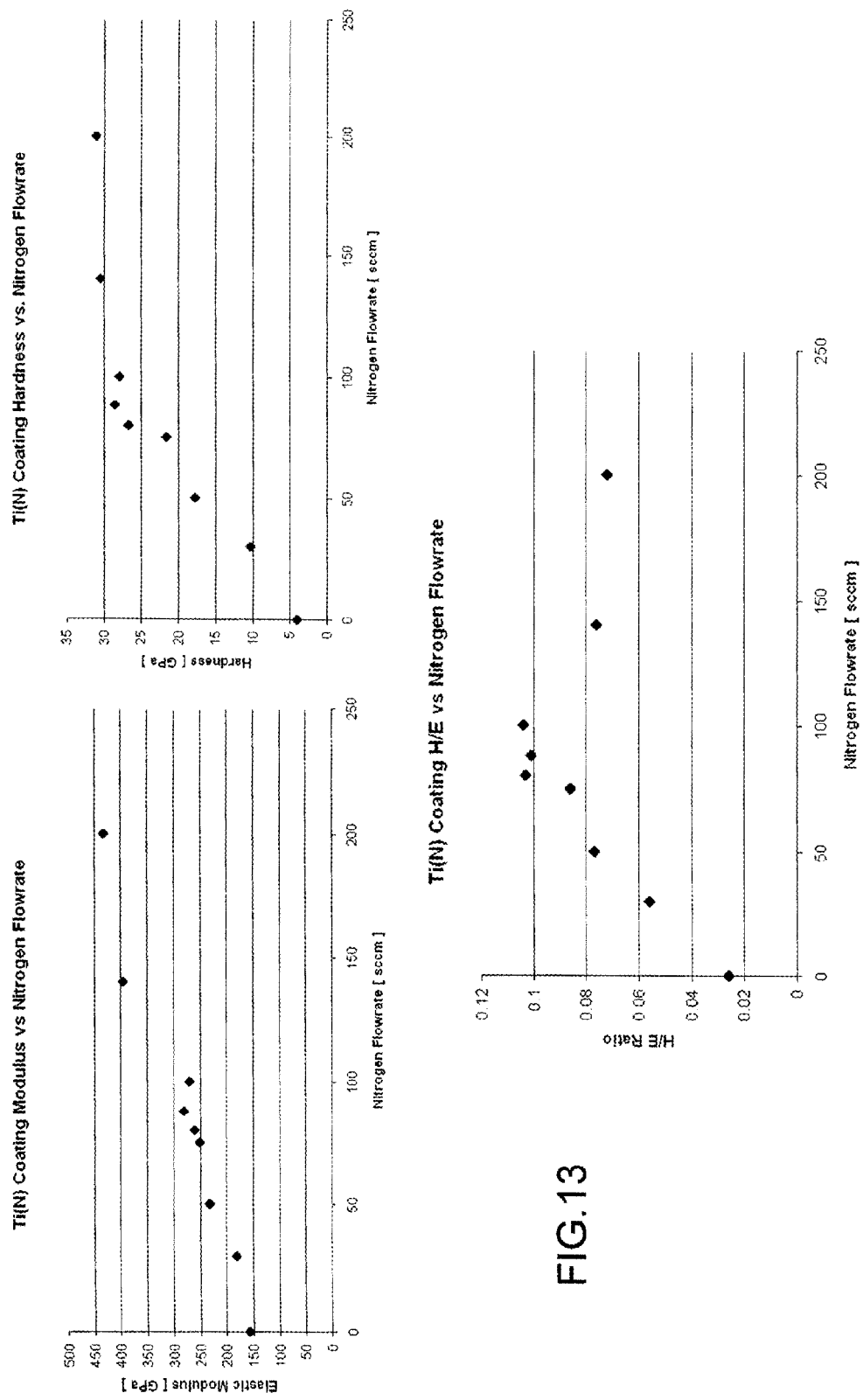
FIG. 13 shows the mechanical properties of a sub-stoichiometric monolithic TiN coating vs. nitrogen flowrate during the LAFAD coating process.
Figure 14A:
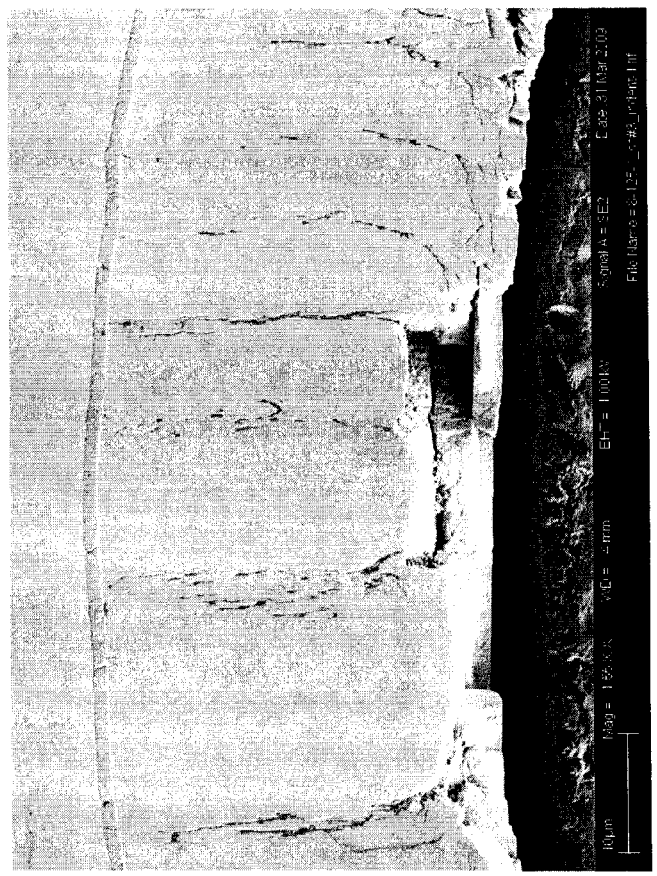
FIGS. 14a and b are SEM micro-images of the cross-section of the Rockwell indentation of a one-segment sub-stoichiometric monolithic TiN coating.
Figure 14B:
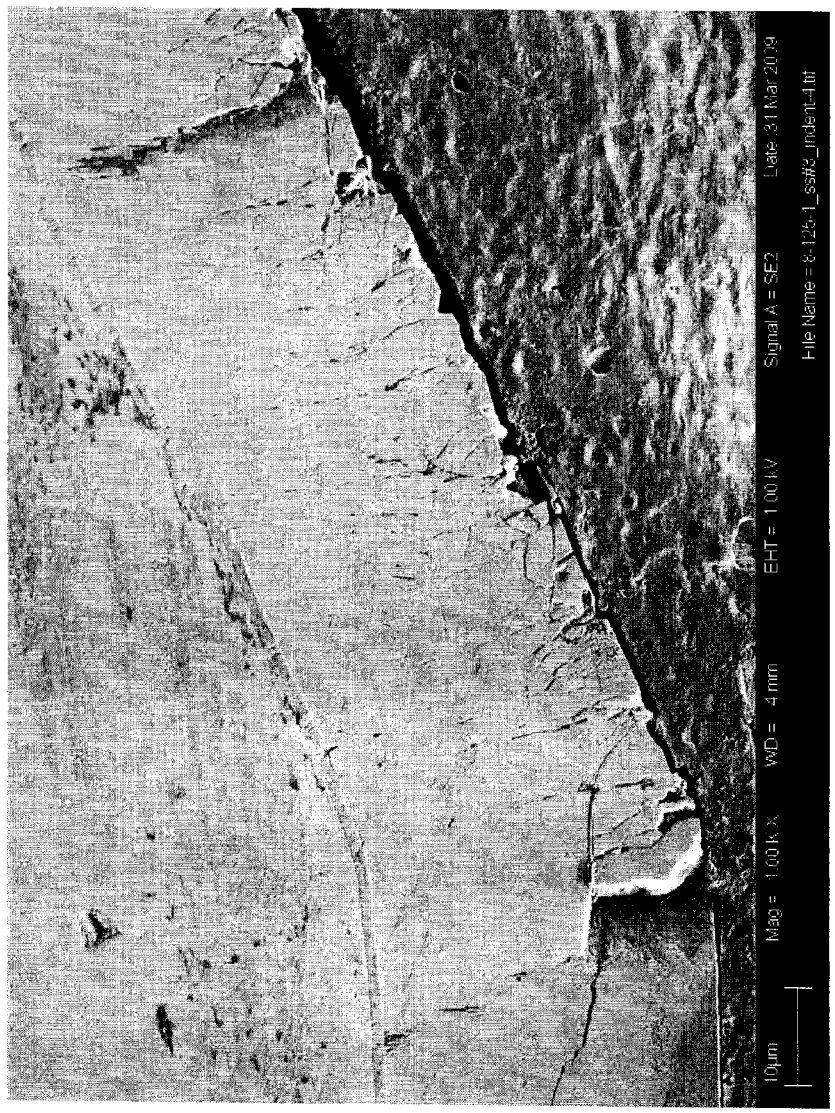

The filtered arc deposition process of the present invention is capable of providing coatings for metal sheets, foil, various instruments and machine components, which protect the surfaces both from wear and corrosion. This is achieved by incorporating metallic elements into the coating such as chrome, aluminum molybdenum either in the metallic sublayers of the multilayer coating architecture or, alternatively, by reducing the concentration of the non-metallic elements such as oxygen, nitrogen or carbon resulting in sub-stoichiometric ceramic and cermet coating with considerable content of elemental metals identical to some of the metallic elements contained in the metal substrate. This substantially reduces or completely eliminates the coating-to-substrate galvanic coupling which may cause corrosion in a corrosive environment. An example of the composition of a nanocomposite sub-stoichiometric coating which is able to protect the compressor blades of the turbine engine made of 17-4PH stainless steel both from sand and rain erosion and corrosion is a $(Ti,Cr,Al)_xN_{1-x}$ composition having about 1 to about 20% free elemental chrome and about less than 40% elemental nitrogen. The mechanical properties of sub-stoichiometric TiN coating vs. nitrogen flowrate during the LAFAD titanium nitride coating deposition process is shown in FIG. 13. It demonstrates that TiN mechanical properties can be controlled by varying the nitrogen content in a coating. It can be seen that the hardness and elastic modulus of sub-stoichiometric coating are increased with an increase of the nitrogen flowrate reaching the maximum in a stoichiometric composition, while the H/E ratio representing coating toughness has maximum in sub-stoichiometric composition. The cross-section of the Rockwell indentation of the sub-stoichiometric TiN coating presented in FIG. 14 shows substantially reduced density of cracks which demonstrates the improved fracture resistance of the sub-stoichiometric coating.

Example 4

Figure 15:
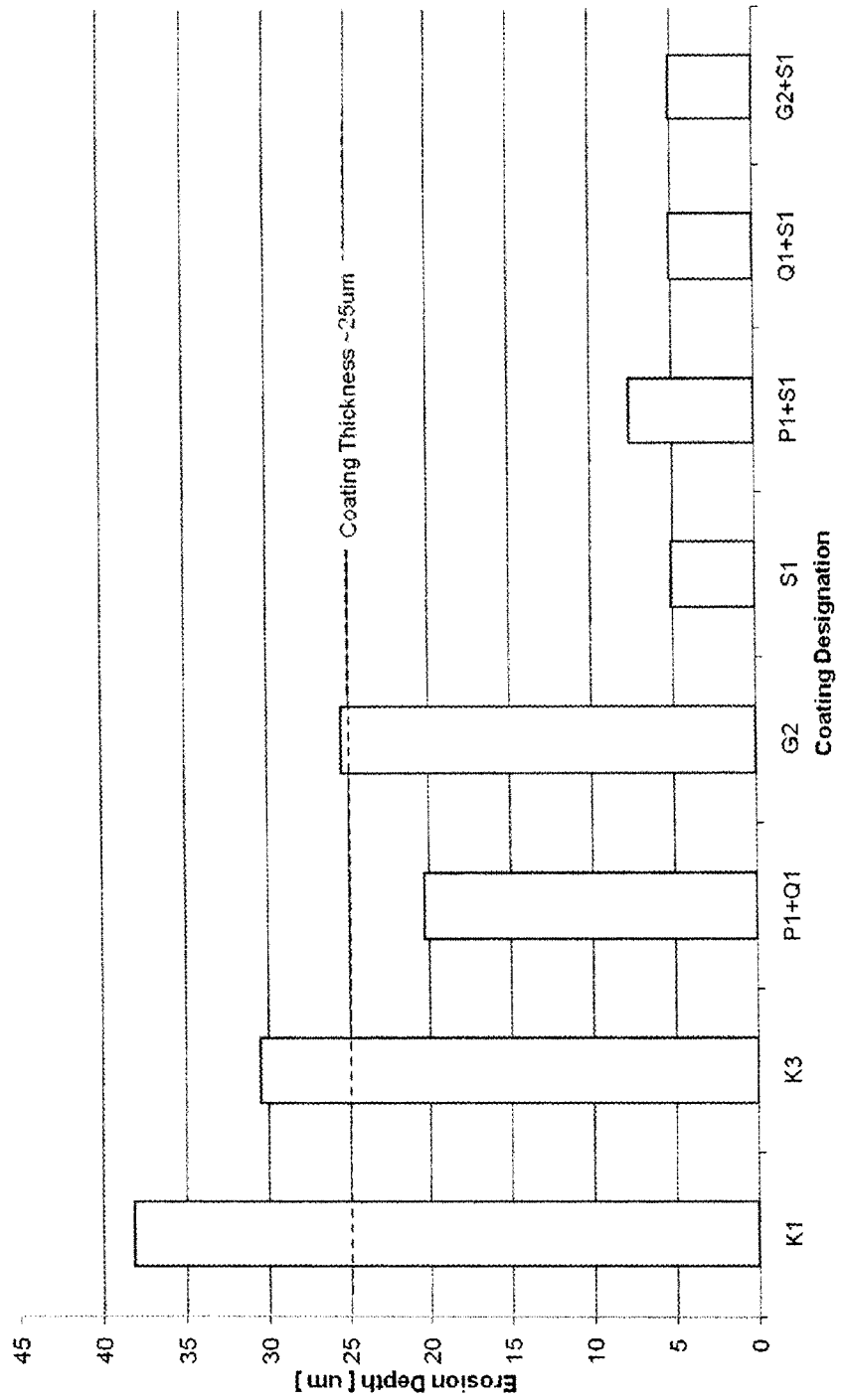
FIG. 15 shows erosion depth produced by 50 μm alumina at a 20° angle of impact.
Figure 16:
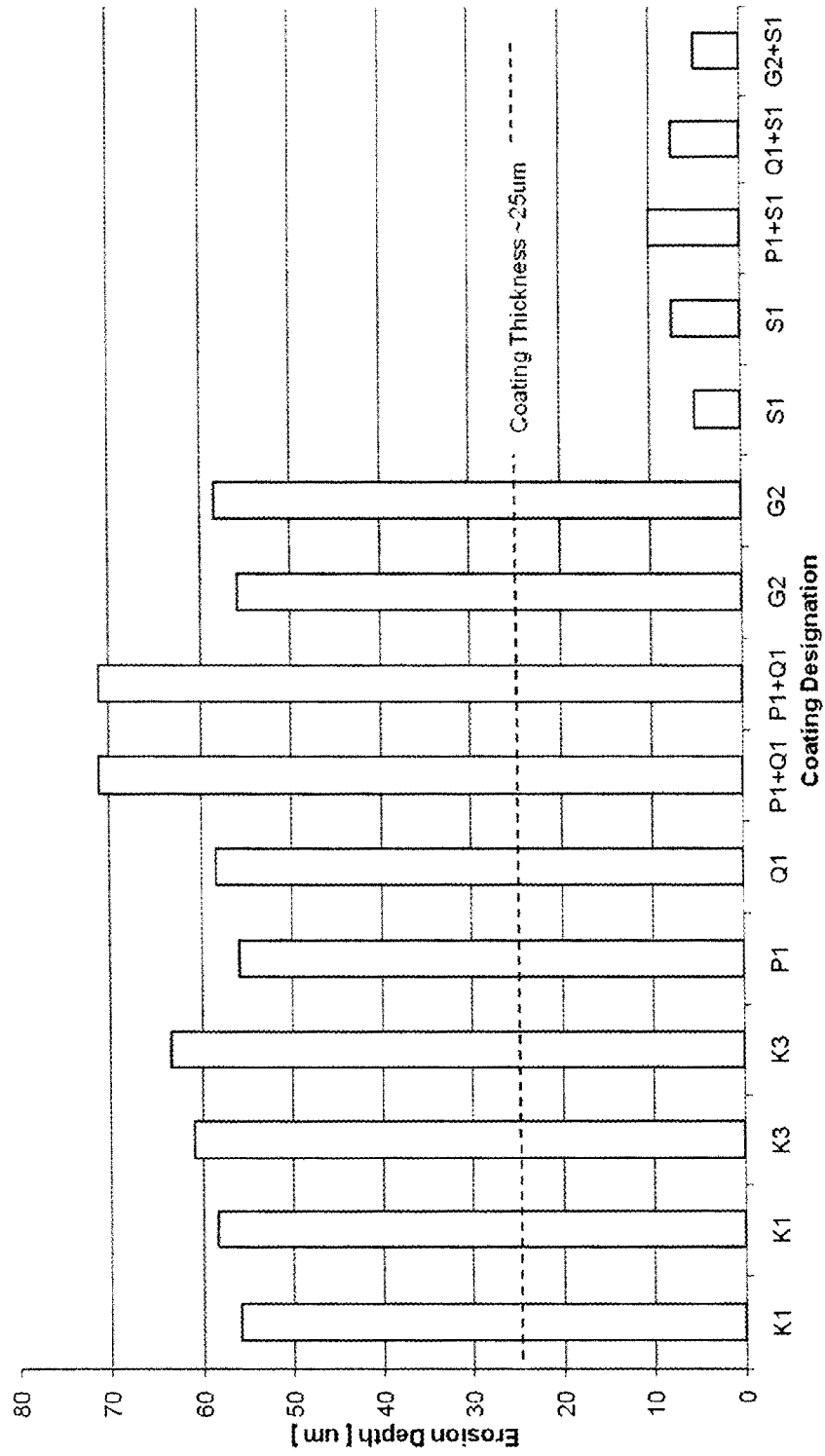
FIG. 16 shows erosion depth produced by 50 μm alumina at a 90° angle of impact.
Figure 17:
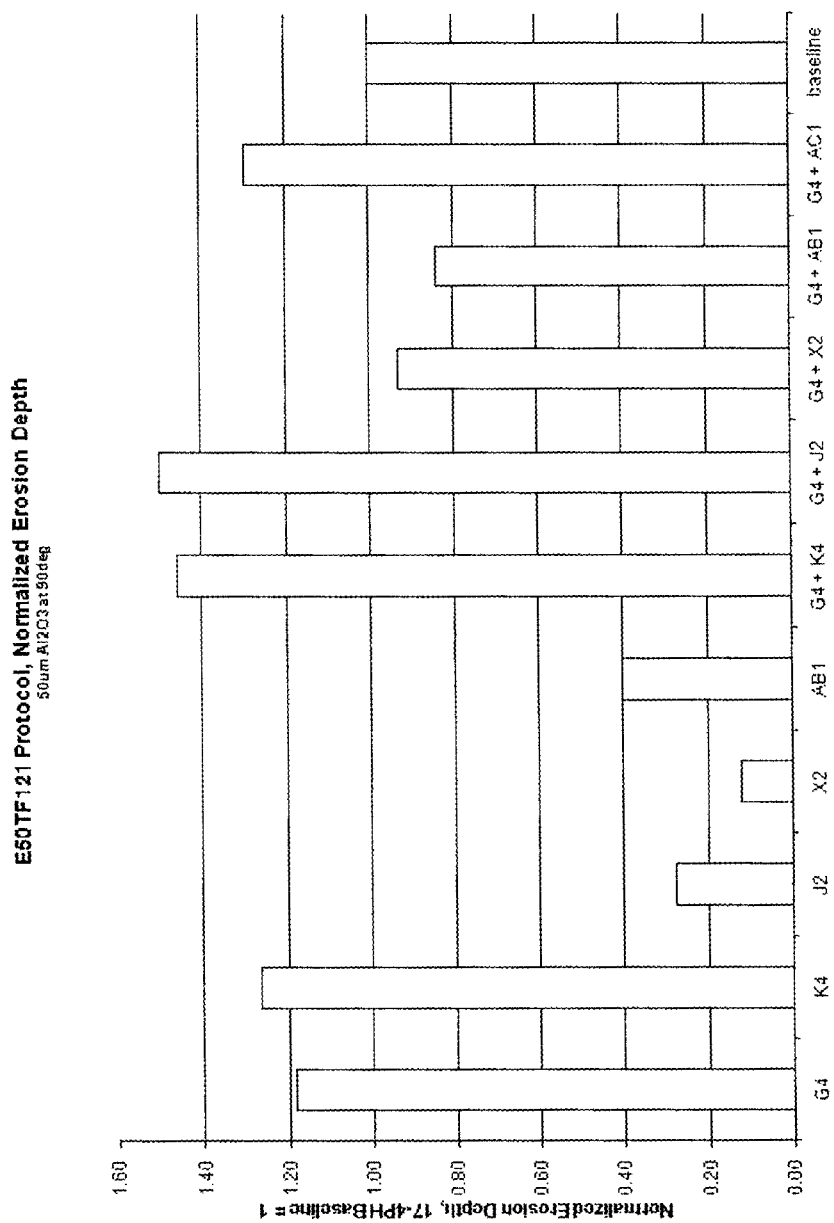
FIG. 17 shows another test result of erosion depth produced by 50 μm alumina at a 90° angle of impact.
Figure 18:
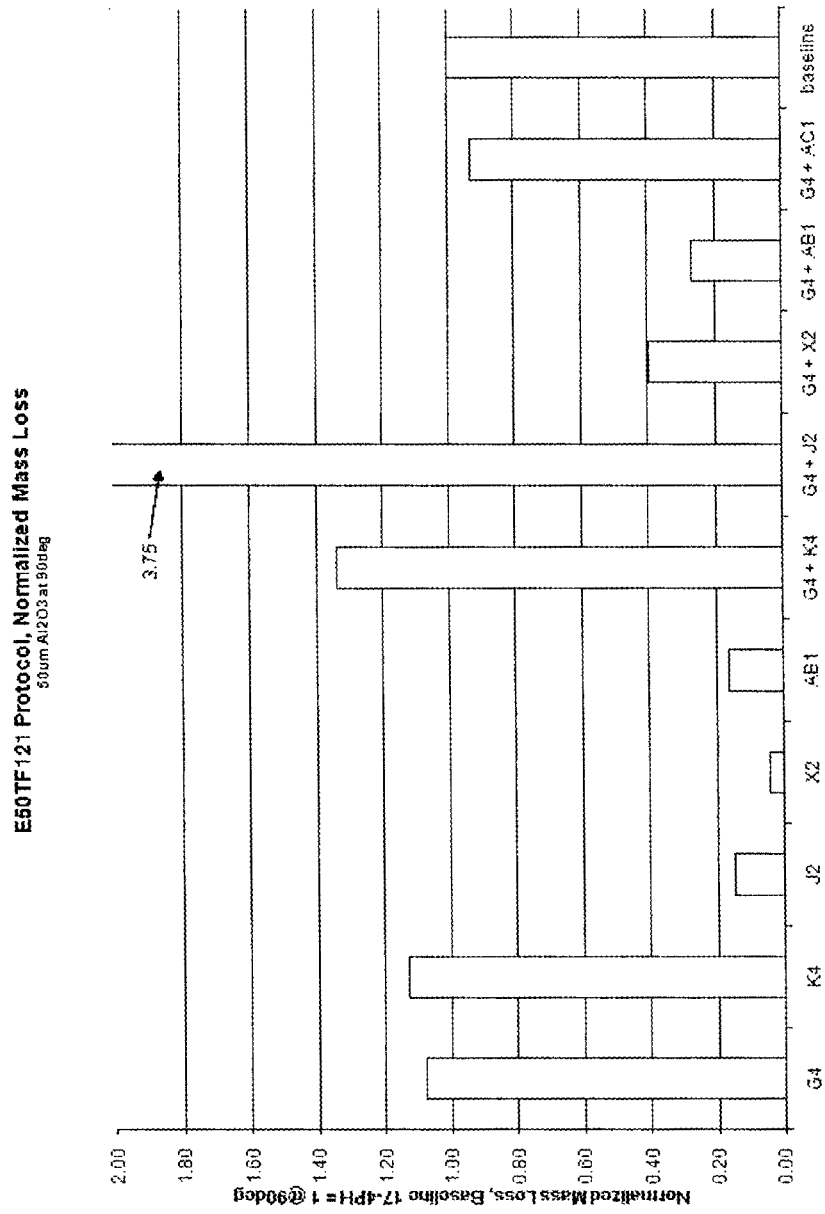
FIG. 18 shows mass loss produced by 50 um alumina at a 90° angle of impact.
Figure 19:
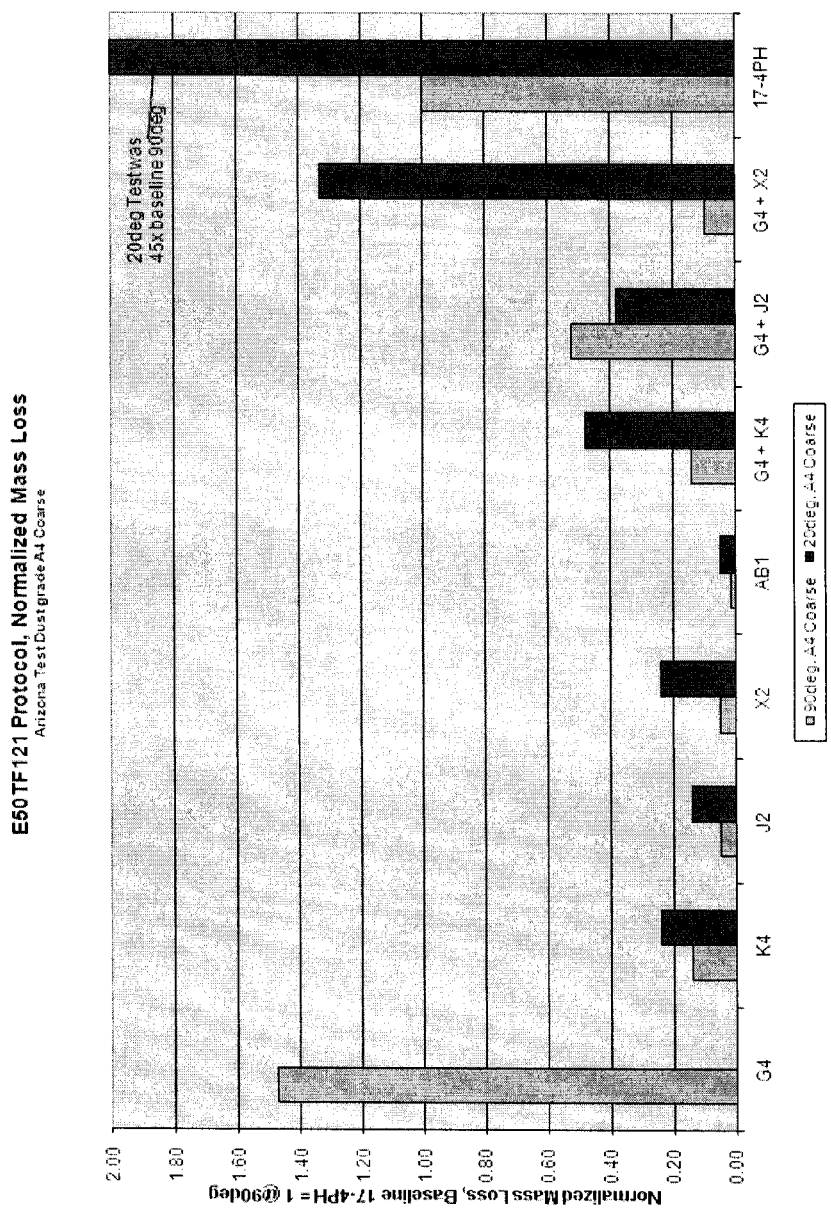
FIG. 19 shows mass loss produced by Arizona Test Dust grade A4 Coarse at a 90° and a 20° angle of impact.
Figure 20:
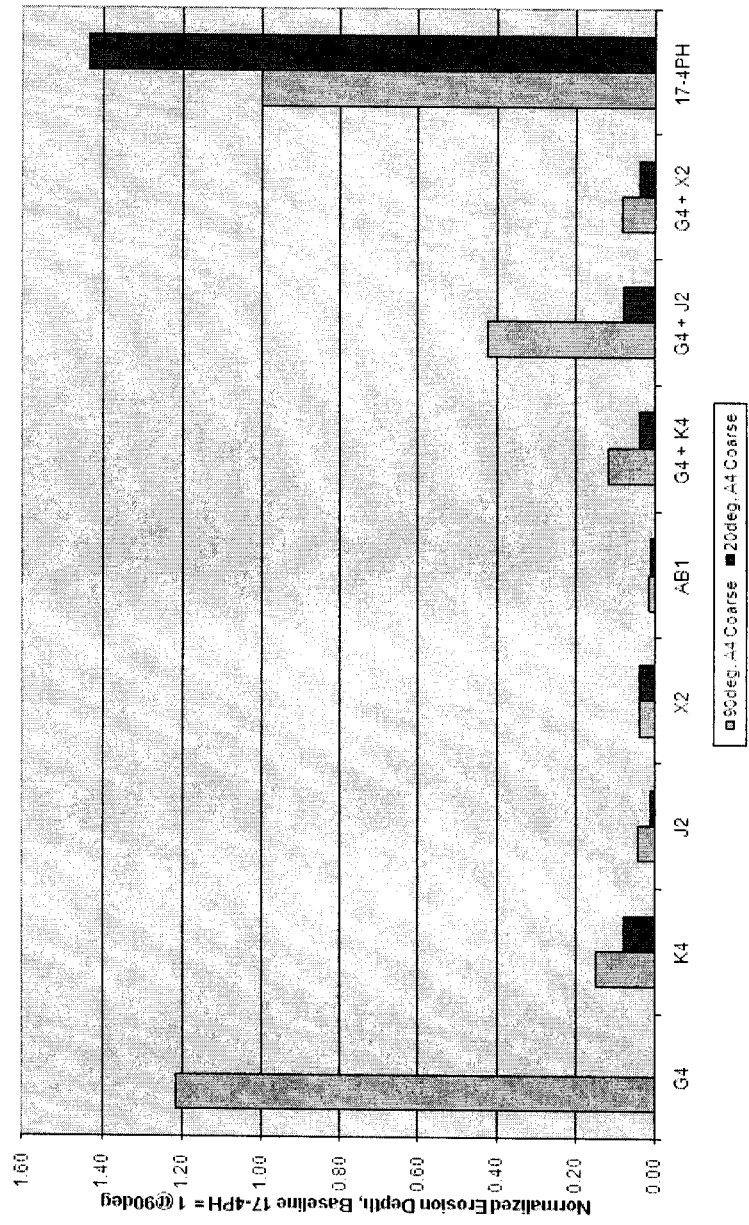
FIG. 20 shows erosion depth produced by Arizona Test Dust grade A4 Coarse at a 90° and a 20° angle of impact.

Evaluation of a Group of One-Segment and Two-Segment Coatings by their Erosion Resistance Performance Several one-segment and two-segment coatings deposited by the LAFAD process were subjected to erosion testing according to the GE ET50TF121 test protocol. The mechanical properties and thicknesses of these coatings are presented in Table 2 shown in FIG. 21. The deposition times of metallic Ti sublayers vs. TiN ceramic sublayers are also shown in Table 2. Smaller deposition time corresponds to thinner sublayers. In this erosion testing the rectangular titanium coupons having dimensions 1"×2"×0.050" were subjected to impact with a jet of alumina powder having an average particle size of 50 μm at different impact angles: 20° and 90°. The weight of abrasive powder erodent used in one test was 600 g and the powder impacted the surface of the coupons at rate of 6.5 g/sec. The flowrate and powder speed were calibrated using samples of identical shape made of Lexan polymeric material. The loss of coating thickness was measured after testing, which characterizes the erosion resistance performance of the coating. The result of this testing is presented in FIG. 15 (20°) and FIG. 16 (90°). It can be seen that sub-soichiometric TiN coating both one-segment and as a top segment of the two-segment coating architecture overperformed multilayer coatings. This can be attributed to high toughness of this coating as indicated by higher H/E ratio in Table 2. Another group of coatings similar to the coatings described in Table 2 was subjected to erosion testing based on the GE ET50TF121 test protocol using 50 μm $Al_2O_3$ powder as an erodent media at 90° impact. The results of coating performance in this test both for the normalized erosion depth and normalized mass loss are shown in FIG. 17 and FIG. 18. These coatings are described in Table 5 shown in FIG. 24. These results support the conclusion of superior erosion resistance performance of sub-stoichiometric coating (X2) vs. multilayer coatings when testing follows the GE ET50TF121 test protocol. The monolithic single segment coating (J2) and two-layer Ti/TiN coating also performed well in this test. The same group of coatings were further subjected to a test based on the GE ET50TF121 test protocol at 20° and 90° impact using Arizona Dust A4 Coarse powder, with particles larger than 100 μm as the erodent media. 600 g of this erodent powder at ~4 g/sec was used in each of these tests. The results of these testing are presented in FIG. 19 (normalized mass loss) and FIG. 20 (normalized erosion depth). These results as well as description of the coating are also presented quantitatively in Tables 3 and 4 shown in FIG. 23 and FIG. 24. These tables also show whether the coating was breached to expose a bear metal substrate after the test. It can be seen that both sub-stoichiometric (X2), dual metal/ceramic (AB1) and monolithic (J2) coatings deposited by the LAFAD process perform extremely well in this test. Dual segment coatings similar to that shown in FIG. 3 (G4+K4) as well as ultra-thick nanolaminated K4 coating also performed well in this test. The following overall ranking of the coatings can be prepared based on testing results per the GE ET50TF121 test protocol: the best coating is a dual layer consisting of the first titanium metallic layer followed by ultra-thick TiN ceramic layer (AB1), the second best is a monolithic TiN J2 coating and the 3$^{rd}$ best is a sub-stoichiometric X2 coating.

When appropriate the coating architecture (eg. a sequence of Me/ceramic bilayers) is applied, a simple cold work or appropriate heat treatment can be applied to fix the distortion of the coated metal sheet substrates both straight and shaped to the desirable geometries.

Figure 4:
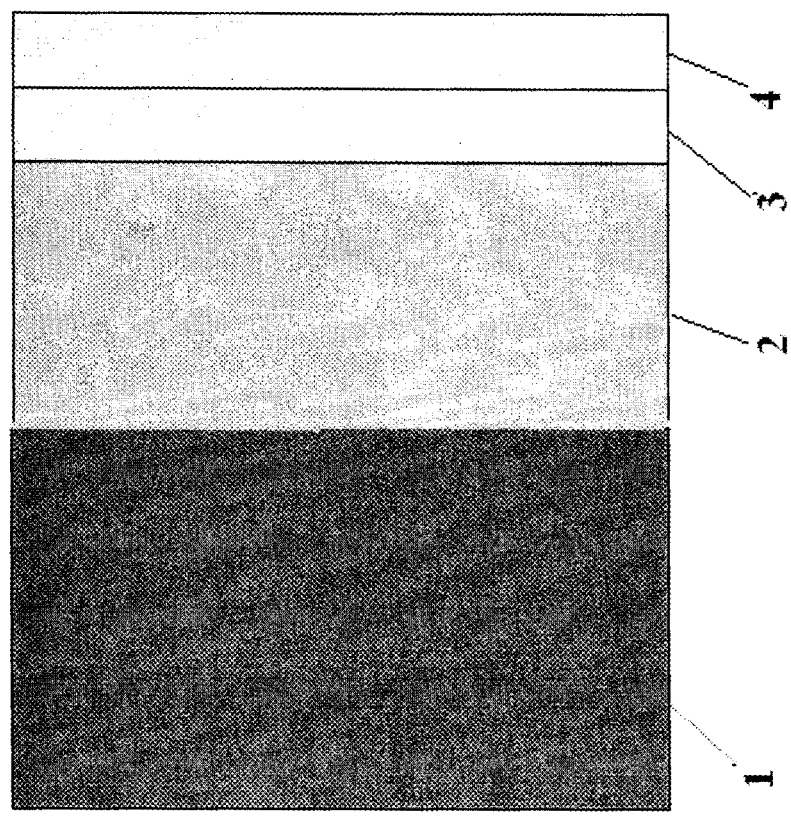
FIG. 4 is a schematic diagram of a cross-sectional view of the protector for helicopter rotorblades utilizing a cold spray metallic interlayer.

In a further advanced embodiment of the invention the coating has two segments forming a duplex architecture as illustrated in FIG. 4. The bottom segment 72 interfacing with the substrate 71 is formed by a non-vacuum processing such as electroplating, plasma spray, thermal spray, cold spray, HVOF or similar process. The thickness of this layer ranges from about 50 to about 1000 μm followed by a top segment 73 deposited by an LAFAD process, which can be monolithic or multilayer (as shown in FIG. 3) and can itself consists of several sub-segments with a total thickness ranging from about 50 μm to about 500 μm. The role of the bottom segment in this duplex coating architecture is to accommodate coating stress and reduce or completely eliminate deformation of the substrate due to a thick cermet coating. It also increases the flexibility of the substrate-coating system which makes this type of surface engineered protector easier to apply to the helicopter rotorblades.

Example 5

Thin Metal Foil with a Duplex Erosion Resistant Coating for Protection of Helicopter Rotorblades Another approach based on using a LAFAD cermet coatings for sand and rain erosion protection of the helicopter rotorblades is utilizing thin sheet stainless having thicknesses ranging from about 40 μm to about 250 μm as the substrate material. A two-segment LAFAD coating having an architecture described in Example 1 and illustrated in FIG. 3 was deposited on thin sheet metal strips. The resulting thin sheet metal strips having a dimension of 4" width× 10" long were prepared to be attached around the end of the helicopter rotor blade for protection against sand and rain erosion. Appropriate epoxy-like compounds can be used to attach the coated thin sheet metal strip to the helicopter rotorblades. The metal foil coated with the hard cermet LAFAD coating having a multilayer duplex architecture is flexible allowing it to be applied to complex shape components without breaking the coating.

Example 6

Deposition of a Duplex Ni+Ti/TiN Coating by Cold Spray Followed by LAFAD Process In this example a 2-segment duplex coating is deposited on rectangular aluminum coupons. The substrate material used in this study is 6061-T6511 aluminum. The typical dimensions of the substrate were 3.0"×1.5"×0.50". Prior to the coating deposition process the substrate coupons are subjected to wet blasting pre-treatment to improve coating adhesion and accommodate intrinsic stresses in the coatings. A cold-spray powder deposition process is used for deposition of the bottom metallic segment of the coating.

This process also known as Supersonic Particle Deposition (SPD) is a process whereby metal powder particles are utilized to form a coating by means of ballistic impingement upon a suitable substrate as described in V. Champagne, D. Helfritch, P. Leyman, S. Grendahl, and B. Klotz, "Formation of 'Super Plastic Agglomerate Mixing'(SPAM) Between Copper and 6061-T6511 Aluminum Deposited by the Supersonic Deposition Process (SPD)", ASM Surface Engineering Congress, 15-18 Sep. 2003. The metal powders range in particle size from <5-50 microns and are accelerated by a supersonic (300-1000 m/s) stream of compressed gas. The spray nozzle design incorporates the use of a converging-diverging throat through which a preheated gas stream is expanded to attain supersonic velocities, with an accompanying decrease in temperature. The term "cold spray" has been used to describe this process due to the relatively low temperatures (0-500° C.) of the expanded gas particle stream that exits the nozzle. The aluminum substrates are placed from 15 to 35 mm from the nozzle exit aperture and coated with nickel to approximately 1 mm in thickness. The coatings are deposited using helium as the powder accelerating gas. The nickel coated aluminum samples are removed from the SPD coating system and the cold spray coating surface is polished to remove any surface asperities and subsequently cleaned ultrasonically in acetone and isopropyl alcohol before loading in the LAFAD coating system for deposition of the top cermet coating consisting of two multilayer sections similar to one shown in FIG. 3. The bottom section of the topcoat consists of 10 Ti/TiN bi-layers with ceramic TiN layers having thickness ranging from 5 to 10 μm separated by Ti metallic layers having thicknesses ranging from 0.5 to 2 μm. The total thickness of the bottom section of the top coating is 60 μm. The top section of the top coating segment consists of 40 Ti/TiN bi-layers with ceramic TiN layers having thicknesses ranging from 1 to 3 μm and Ti metallic layers having submicron thicknesses ranging from 0.1 to 0.5 μm. The total thickness of the top section of the top coating segment is 50 μm. This coating architecture is shown schematically in FIG. 4. It consists a metal substrate 71, a cold spray metallic layer 72, a bottom multilayer LAFAD coating segment 73 and a top multilayer LAFAD coating segment 74. This allows use of an inexpensive and light aluminum as a substrate metal coated with duplex Ni(SPD)+Ti/TiN(LAFAD) coatings for protectors of the helicopter rotorblades. These protected rotorblades will be nearly 3 times lighter than protectors traditionally made of stainless steel and 2 times lighter than protectors made of titanium.

Figure 25A:
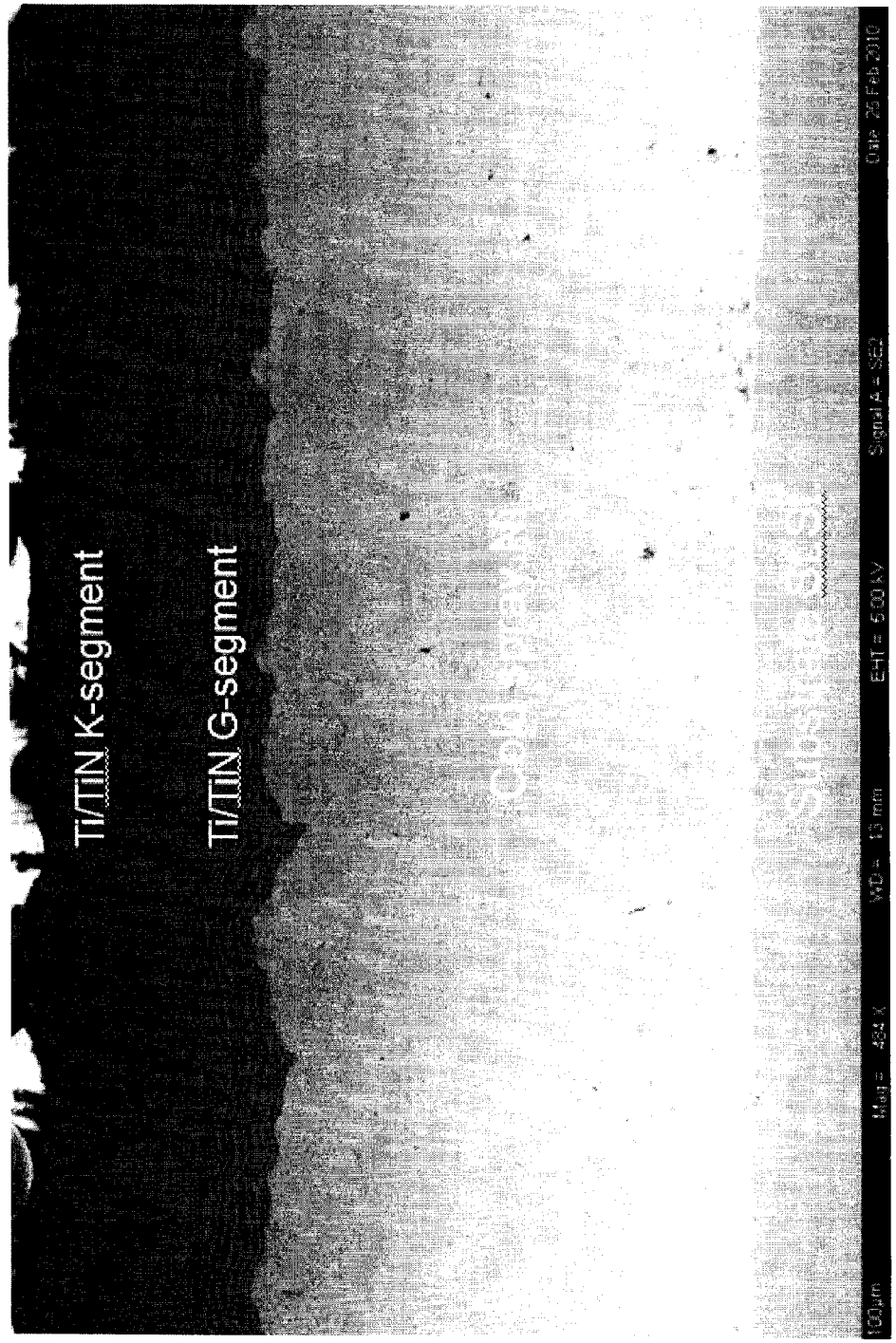
FIGS. 25a and b are SEM micro-images of the cross-section of a 3-segment coating utilizing a cold spray nickel bottom segment coating, a Ti/TiN microlaminated medium G-segment, and a Ti/TiN multilayer top K-segment.
Figure 25B:
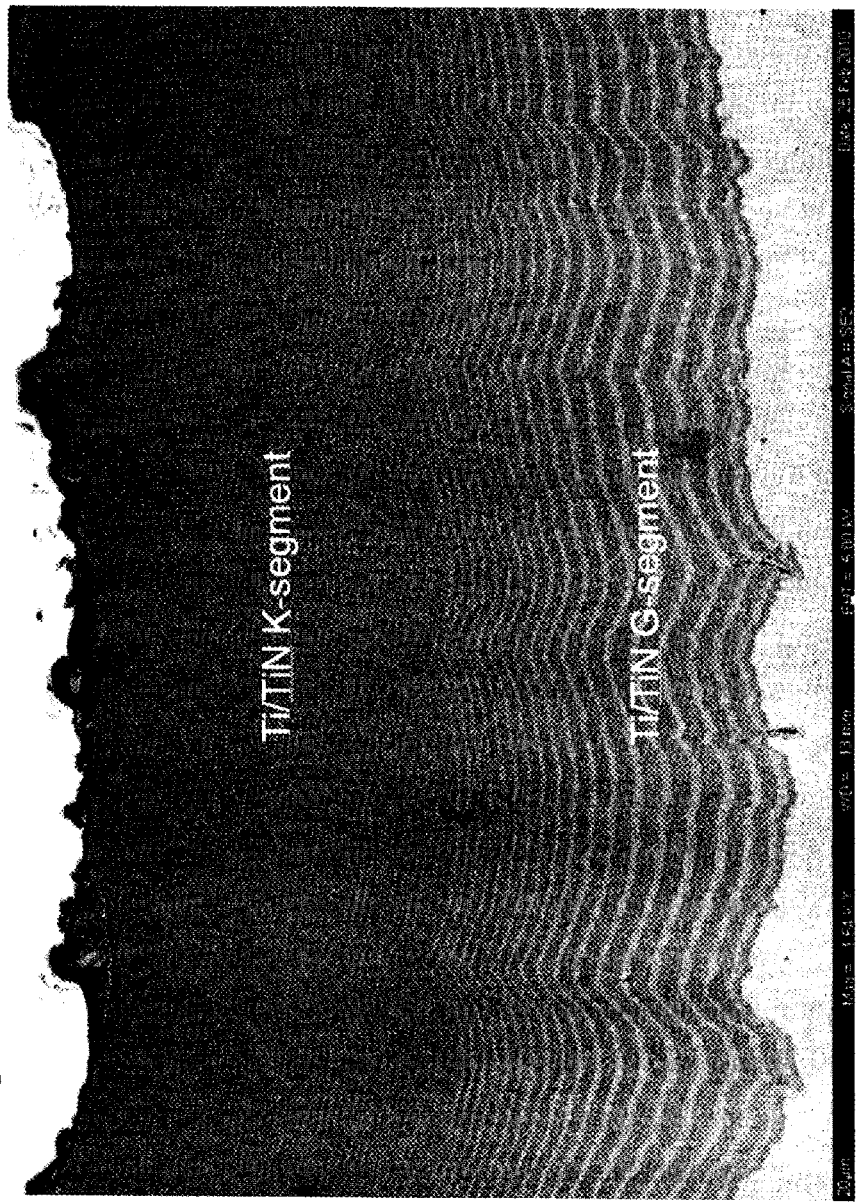

This conceptual coating design was experimentally proved by deposition of GK coating having a thickness of about 100 μm similar to one shown in FIG. 3 on top of a nickel coating, having a thickness of about 300 μm deposited on a stainless steel substrate by a cold spray deposition process. The SEM images of this coating with different magnifications are shown in FIG. 25a and FIG. 25b. It can be seen that the cold spray coating is developing a waving pattern at the cold spray nickel to the LAFAD GK coating segment interface. This waving pattern has resulted in improved adhesion of the LAFAD coating to the cold spray bottom coating segment.

Example 7

Deposition of a Duplex NiTi+Ti/TiN Coating by Cold Spray Followed by a LAFAD Process In this example a 2-segment duplex coating consisting of a bottom segment made of equiatomic NiTi shape memory alloy followed by a Ti/TiN multilayer top coating segment is deposited on rectangular aluminum coupons. Coupons of the same size and materials as in Example 3 are used. The same cold-spray SPD process is used for deposition of the NiTi alloy which resulted in the deposition of a 1 mm bottom segment NiTi coating. The top segment Ti/TiN microlaminated LAFAD coating is deposited using the same deposition time and other coating process parameters to a thickness of 120 μm. This coating architecture is shown schematically in FIG. 4. It consists of a metal substrate 71, a cold spray metallic layer 72, a bottom multilayer LAFAD coating segment 73 and a top multilayer LAFAD coating segment 74.

The deposition of NiTi alloys for erosion and corrosion protection was previously described in U.S. Pat. No. 6,043, 451 to Julien et al. issued Mar. 28, 2000, which is incorporated herein as reference. In this invention the deposition of the NiTi alloy was made by an arc plasma spray process. In this process the metal particles are heated to the melting temperature. It is known that NiTi alloy loses its shape memory properties after heating it to high temperatures. The advantage of having a NiTi alloy or Nitinol as a bottom segment coating is its vibration damping ability which would be lost after overheating in a plasma spray process. However, using the cold spray deposition process the Nitinol segment can be deposited without detrimental effect on its vibration damping properties. The top cermet segment of multilayer Ti/TiN coating deposited by the LAFAD process is aimed to provide erosion resistance protection which metallic layers don't have.

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. An erosion and corrosion resistant protective coating for turbomachinery applications, the coating comprising:
   at least two multilayer coating segments, a bottom segment applied to a surface of a conductive metal substrate and a top segment overlaying the bottom segment, each of the at least two multilayer coating segments having a combined thickness of at least about 40 µm to 300 µm, the at least two multilayer coating segments comprising a plurality of bilayers, the bilayers each comprising a metal layer overlayed by a ceramic layer, wherein metal content of the coating segment decreases from an area proximate the substrate to an area distal the substrate and hardness and elastic modulus of the coating segment increase from an area proximate the substrate to an area distal the substrate;
   wherein the surface of the conductive metal substrate is subject to a predeposition treatment by at least wet blasting, dry blasting, or powder spray to provide the surface with texture;
   wherein, hardness of the bottom segment is from about 0.3 GPa to about 25 GPa, and hardness of the top segment is from about 25 GPa to about 80 GPa;
   wherein, roughness of the erosion and corrosion resistant coating is Ra<1 µm;
   wherein, the erosion and corrosion resistant coating has a dome-like structure and dome width is from about 1 µm to about 20 µm; and
   wherein the metal layer and ceramic layer are blended into one another by concurrent condensation with ion bombardment from at least two metal-gaseous filtered cathodic arc plasma beams overlapped by a filtering focusing magnetic field, the deposition rate from about 3 µm/hr to about 30 µm/hr.

2. The coating of claim 1, wherein a ratio of a thickness of said metal layer to a thickness of said ceramic layer in said plurality of bilayers decreases from an area proximate the substrate to an area distal the substrate.

3. The coating of claim 1, wherein a thickness of the metal layers of the plurality of bilayers decreases from an area proximate the substrate to an area distal the substrate.

4. The coating of claim 1, wherein said metal layers of said plurality of bilayers proximate the substrate have a thickness of from about 0.1 µm to about 5 µm, and said ceramic layers of said plurality of bilayers have a thickness of from about 1 µm to about greater than 10 µm.

5. The coating of claim 1, further comprising a continuous monolithic ceramic layer overlaying said at least two multilayer coating segment.

6. The coating of claim 5, wherein said continuous monolithic ceramic layer has a lesser concentration of non-metallic elements proximate said substrate.

7. The coating of claim 5, wherein said continuous monolithic ceramic layer comprises a carbon diamond-like coating having a hardness of from about 30 to about 80 GPa and a thickness of from about 5 µm to about 60 µm.

8. The coating of claim 1, wherein the metal in the ceramic layer is the same metal as the metal in the metal layer.

9. The coating of claim 1, wherein said conductive metal substrate is selected from the group consisting of titanium alloy, nickel alloy and stainless steel.

10. The coating of claim 1, wherein said conductive metal substrate comprises a side opposite the surface and a pattern of grooves is on the side of said substrate opposite said surface.

11. The coating of claim 10, wherein said conductive metal substrate has a pattern of grooves on said surface of said substrate to be coated.

12. The coating of claim 10, wherein said conductive metal substrate has a grid attached to said side of the substrate opposite said coating.

13. The coating of claim 1, wherein said coating is discontinuous and forms repeated geometrical shapes separated by narrow uncoated ribbons.

14. The coating of claim 1, wherein metal in said metal layers of said plurality of bilayers is selected from the group consisting of titanium, chromium, vanadium, molybdenum, aluminum, hafnium, zirconium, niobium, tungsten, and alloys thereof.

15. The coating of claim 1, wherein said ceramic in said ceramic layers of said plurality of bilayers comprises ceramic compounds selected from the group consisting of carbides, nitrides, carbonitrides, oxycarbides, and oxynitrides of the metal selected from the group consisting of titanium, chromium, vanadium, molybdenum, aluminum, hafnium, zirconium, niobium, tungsten, and alloys thereof.

16. The coating of claim 1, further comprising a base metal layer applied to said conductive substrate by a method selected from the group consisting of cold spray, thermal spray, HVOF, D-gun, and electroplating to be overlayed by said at least two multilayer coating segments.

17. The coating of claim 16, where the said base metal layer has a thickness of from about 40 µm to about 1 mm.

18. The coating of claim 1, wherein said ceramic layers of said plurality of bilayers has a lesser concentration of non-metallic elements proximate said substrate.

19. The coating of claim 1, wherein, toughness of the erosion and corrosion resistant coating is H/E>0.02, where H is hardness and E is elastic modulus.

20. The coating of claim 1, wherein, toughness of the erosion and corrosion resistant coating is H/E>from about 0.02 to about 0.1, where H is hardness and E is elastic modulus.

21. An erosion and corrosion resistant protective coating for turbomachinery applications, the coating comprising:
   at least two multilayer coating segments, a bottom segment applied to a surface of a conductive metal substrate and a top segment overlaying the bottom segment, each of the at least two multilayer coating segments having a combined thickness of at least about 40 µm to about 500 µm, the at least two multilayer coating segments comprising a plurality of bilayers, the bilayers each comprising a metal layer overlayed by a ceramic layer,
   wherein the surface of the conductive metal substrate is subject to a pre-deposition treatment by at least dry-blasting, wet-blasting, or powder spray coating to provide the surface with texture,
   wherein the coating has an array of dome-like structures with dome widths from about 1 µm to about 20 µm, wherein the multilayer coating segments are formed by concurrent condensation with ion bombardment from metal-gaseous plasma flow with nearly 100% ionized metal atoms, the deposition rate from about 3 μm/hr to about 30 μm/hr.

22. The coating of claim 21, wherein the metal layer and ceramic layer are blended into one another by concurrent condensation with ion bombardment from at least two metal-gaseous filtered cathodic arc plasma beams overlapped by a filtering focusing magnetic field.

23. The coating of claim 21, wherein the pre-deposition treatment comprises powder spray coating.

24. The coating of claim 21, wherein the hardness of the top coating segment is from about 25 GPa to about 80 GPa.

25. The coating of claim 21, wherein the surface texture of the metal substrate following pre-deposition treatment has a surface roughness Ra>1 μm.

26. The coating of claim 21, wherein the surface roughness of the top surface of the coating is Ra<1 μm.

27. The coating of claim 21, wherein a surface roughness of the top surface of the coating is less than the surface roughness of the metal substrate.

\* \* \* \* \*